(12) United States Patent
Lemarchand et al.

(10) Patent No.: US 11,002,547 B2
(45) Date of Patent: May 11, 2021

(54) METHOD FOR DETERMINING THE ORIENTATION OF A SENSOR FRAME OF REFERENCE TIED TO A MOBILE TERMINAL CARRIED OR WORN BY A USER

(71) Applicant: MOVEA, Grenoble (FR)

(72) Inventors: Antoine Lemarchand, Grenoble (FR); Etienne De Foras, Saint Nazaire les Eymes (FR)

(73) Assignee: Movea, Grenoble (FR)

( * ) Notice: Subject to any disclaimer, the term of this patent is extended or adjusted under 35 U.S.C. 154(b) by 348 days.

(21) Appl. No.: 15/105,757

(22) PCT Filed: Dec. 15, 2014

(86) PCT No.: PCT/EP2014/077838
§ 371 (c)(1),
(2) Date: Jun. 17, 2016

(87) PCT Pub. No.: WO2015/091402
PCT Pub. Date: Jun. 25, 2015

(65) Prior Publication Data
US 2016/0313126 A1    Oct. 27, 2016

(30) Foreign Application Priority Data

Dec. 18, 2013  (FR) ...................................... 1362847

(51) Int. Cl.
*G01C 21/20*  (2006.01)
*G01C 21/16*  (2006.01)
*G01P 13/00*  (2006.01)
*G01C 21/18*  (2006.01)
*G01P 15/08*  (2006.01)

(52) U.S. Cl.
CPC ............. *G01C 21/20* (2013.01); *G01C 21/16* (2013.01); *G01C 21/18* (2013.01); *G01C 21/206* (2013.01); *G01P 13/00* (2013.01); *G01P 15/08* (2013.01)

(58) Field of Classification Search
CPC ..................................................... G01C 21/20
See application file for complete search history.

(56) References Cited

U.S. PATENT DOCUMENTS 5,744,953 A * 4/1998 Hansen ................ A61B 5/1036
324/207.17
6,122,960 A * 9/2000 Hutchings .............. A63B 24/00
73/493

(Continued)

*Primary Examiner* — Hyun D Park
(74) *Attorney, Agent, or Firm* — Bay Area Technology Law Group PC

(57) ABSTRACT

Method for determining the orientation of the trajectory followed by a pedestrian, associated with a trajectory frame, with respect to a reference frame is provided. At least one motion sensor associated with the pedestrian generates data representative of the motion of the sensor housing on the basis of said sensor assembly in the reference frame. A first rotation transformation operator representative of the orientation of the reference frame with respect to the trajectory frame is calculated. The data representative of the motion after transformation by said first operator exhibits at least one characteristic of a set of characteristics which are representative of signals of walking or running motion of a pedestrian and are expressed in the pedestrian frame.

18 Claims, 8 Drawing Sheets

(56) References Cited

U.S. PATENT DOCUMENTS

| | | | |
|---|---|---|---|
| 2007/0032748 A1* | 2/2007 | McNeil | A61B 5/1038 600/595 |
| 2009/0012921 A1* | 1/2009 | Bonnet | G06K 9/00342 706/12 |
| 2009/0198155 A1* | 8/2009 | Bonnet | A61B 5/1038 600/595 |
| 2012/0283856 A1* | 11/2012 | Caritu | G01C 22/02 700/91 |
| 2012/0296603 A1* | 11/2012 | Kulik | G01C 21/16 702/160 |
| 2013/0023798 A1* | 1/2013 | Greene | A61B 5/6828 600/595 |
| 2013/0324890 A1* | 12/2013 | Youssef | A61B 5/11 600/595 |
| 2014/0357305 A1* | 12/2014 | Haverinen | H04W 4/026 455/456.6 |
| 2015/0316579 A1* | 11/2015 | Pakzad | G06F 3/0346 702/150 |

\* cited by examiner

METHOD FOR DETERMINING THE ORIENTATION OF A SENSOR FRAME OF REFERENCE TIED TO A MOBILE TERMINAL CARRIED OR WORN BY A USER

FIELD OF THE INVENTION

The invention pertains to a method for determining the orientation of the trajectory followed by a pedestrian, associated with a trajectory frame, with respect to a reference frame, the pedestrian being furnished with a sensor housing comprising a sensor assembly comprising at least one motion sensor.

TECHNICAL BACKGROUND OF THE INVENTION

A method for determining the orientation of the trajectory followed by a pedestrian, associated with a trajectory frame, with respect to a reference frame, by means of a sensor assembly comprising at least one motion sensor, with which the pedestrian is furnished, can be useful in diverse applications such as pedestrian navigation, be it indoors or outdoors, for which it is necessary to locate the pedestrian and/or determine his trajectory. The pedestrian can undertake a walking or running activity. Several techniques are known for locating a pedestrian in an absolute manner on a plane. It is for example possible to refer to the article by Robert Harle, "A Survey of Indoor Inertial Positioning Systems for Pedestrians" published under the reference IEEE COMMUNICATIONS SURVEYS & TUTORIALS, VOL. 15, NO. 3, THIRD QUARTER 2013 1281.

The techniques most commonly used in navigation are the GNSS techniques (the acronym standing for "Global Navigation Satellite System"). In the optimal cases, these techniques make it possible to attain accuracies of a few meters. The carrier of the GNNS receiver is located in an absolute manner, at each instant. These techniques are, however, dependent on the capacity of the carrier to receive the signals from the satellites. Indoors, or in urban environments where several satellites may be hidden (so-called "urban canyon" effect), GNSS techniques may turn out to be inoperative or defective. Moreover, they exhibit a rather unadvantageous electrical consumption budget.

The use of the radio signals (GSM, WIFI, etc.) transmitted and received by a mobile telephone can also be utilized, including indoors, to locate pedestrians in an absolute manner with respect to the points of radio access but they generate rather inaccurate or noisy positions (at best 100 meters for the GSM radio signal, errors of several tens of meters are possible for WIFI, with notably position jumps from one instant to the next), they are dependent on the equipment in situ, and exhibit an unfavorable consumption budget.

The use of a sensor assembly with which the pedestrian is furnished, comprising at least one motion sensor, makes it possible to alleviate these defects, by replacing or by complementing the weaknesses of the procedures conventionally used, by providing a relative trajectory, based on the instantaneous estimations of speed and heading. The trajectory is then computed gradually by accumulation of elementary displacements (these techniques are known by the name "dead reckoning" or "navigation by dead reckoning"). Applications can range from the mass-market sector to the civil security or defense sectors, in all situations notably or other location systems are absent or deficient. "Dead reckoning" turns out to be very complementary to solutions involving absolute location. These latter provide noisy absolute positions, whereas "dead reckoning" provides a relative displacement.

For several years, the problem of indoor location of people has been a very active research topic, so numerous are the potential applications. Among the most promising technologies (location by Ultra Large Band (ULB) radio technique, location by Wifi technique, or location by Vision technique for example), the approach based on inertial measurement exhibits significant attractiveness for mass-market applications since the primary measurement means (a sensor assembly comprising at least one motion sensor) are now available to users through portable telephones and PC tablets. Other accessory devices are appearing on the market, also equipped with these means for measuring motion, such as interactive spectacles or watches worn on the wrist. The approach to location based on measuring motion of the present patent application relies indeed only on motion sensors carried or worn by the user, and is therefore independent of any infrastructure. Mass-market devices such as portable telephones or other tablets, interactive spectacles, watches, or other accessories now incorporate the basic sensors, namely accelerometer (A), gyrometer (G), magnetometer (M) and pressure sensor (P), and it is thus possible, without resorting to prior specific mappings and/or equipment in situ where the location is practiced (on which the other procedures cited are dependent), to provide the information regarding displacements over time and hence to plot the trajectory of the pedestrian.

The technique commonly employed for indoor location of a pedestrian with the aid of inertial sensors (in which in addition gyrometric sensors (G) and accelerometric sensors (A) and loosely speaking the magnetometer (M) are often included) consists in applying a so-called "dead reckoning" procedure, which estimates the current position in a reference frame (generally tied to a terrestrial frame, often merged therewith, in the North, East, Vertical direction) on the basis of the previous position, to which is added a displacement increment. For a very conventional case of a displacement over a plane in two dimensions (example of a ship moving on the surface of the sea, or of a vehicle moving on the surface of the earth, or of a pedestrian moving over a horizontal surface), the displacement increment is defined by a two-dimensional vector, whose norm is equal to the speed of displacement multiplied by the time increment from the instant of the previous position, and the angle is computed by the heading of the mobile object which is moving.

For a boat (one then often speaks of "navigation by dead reckoning"), it is possible to estimate the speed of displacement for example on the basis of instruments measuring the relative speed of the boat with respect to the water. Such an instrument can consist for example of a floating anchor, which is immobilized with respect to the water, and to which a rope will have been attached. The floating anchor is thrown into the water by an operator, and the operator then counts the length of rope which unwinds per unit time, so as to deduce the speed of the boat with respect to the water. The unwound length of rope can be charted by virtue of a system of knots distributed over the rope. The operator then counts the number of knots per unit time (whence the fact that the speed is expressed in knots). The heading can be estimated by a compass. For a terrestrial vehicle, it will be possible to estimate the speed on the basis of the number of revolution of wheels per second. The heading being able to be estimated by a procedure similar to the case of the ship and optionally supplemented with the direction information given by the steering wheel. In the case of a pedestrian wearing a system of motion sensors, such as those present in a smartphone or other worn accessory such as watches (on the wrist) or interactive spectacles (worn on the head), it is commonplace to estimate the modulus of the velocity vector on the basis of the measurement of the walking rate or, what is equivalent, by counting the footsteps taken, which can be obtained on the basis of the signals sensed by sensors responsive to the motions that the pedestrian impresses on the sensors, and of a function which thereafter transforms the rate into speed, or the number of footsteps into distance, according, for example, to models related to the morphology of the person. These procedures are perfectible but, for example, if one has access to a calibration of the function carried out with the aid of a test suite, it is possible to obtain accuracies of a few percent.

However, in the case of the pedestrian, the heading is not easy to estimate, insofar as, if the system of sensors actually makes it possible to measure an orientation (and therefore a heading) of the sensor system in the reference frame (or to fix matters, of the terrestrial frame), it is not possible to simply link this orientation to the heading followed by the pedestrian. Indeed, depending on the way in which the pedestrian carries or wears the sensor, and multiple possibilities are noted, able in addition to vary over time, it appears a priori that it is not possible to establish any relationship between the heading of the trajectory and the orientation of the sensor in the terrestrial frame.

A simple solution can be to ask the user to carry or wear his sensor, i.e. his mobile terminal or his accessory, since the sensor is tied in motion or bound in motion to the mobile terminal, in a constrained manner, for example by pointing it in the direction of walking, or by fixing the sensor (i.e. the mobile terminal or the accessory) in a unique and known manner on their body. The heading of the trajectory is then known since this heading can be deduced from the orientation of the mobile terminal. However, this constraining procedure hampers the adoption of location solutions based on the principle of inertial sensors, and on the other hand, there is no guarantee of the user being capable of keeping to the command. Moreover, for devices which guarantee a known position on the body, such as interactive spectacles equipped with motion sensors and placed on the head in a known manner, or an accessory belted around the waist, it is still necessary to cope with common situations in which the user turns their head to a heading which is not that of the trajectory that he is following or that the position of the accessory changes from one day to the next or even during one and the same navigation exercise. Indeed, the position of the accessory on the waist does not of itself make it possible to guarantee the relation between the orientation of this accessory and the heading of the pedestrian. For watches equipped with motion sensors, the way in which the watch is worn remains variable from one individual to another, the motions impressed on the arm generate temporal variations of the heading of the watch, and the manner of carriage may also vary over time for one and the same individual. The heading of the trajectory of the user may not therefore be deduced from the heading of the watch.

It is therefore apparent that there is a significant need to propose procedures for continuous estimation of this unknown orientation of the sensor with respect to the trajectory followed by the pedestrian. It is the object of this invention to propose a method for estimating this orientation.

This problem consisting in determining the relationship between sensor and trajectory, called for example "sensor-to-trajectory" or "sensor-to-traj" or "angle misalignment", is very complex.

This complex problem is little studied in the literature. Most inertial navigation systems for pedestrians generally assume that the orientation of the sensor with respect to the trajectory is known (such is the case for example for a sensor attached to the sternum or to the foot etc.). However, a certain number of articles and patent documents dealing with the problem have been identified, hereinafter.

The article "Which way am I facing: Inferring horizontal device orientation from an accelerometer signal", by Kunze K., Lukowicz P., Partridge K., and Begole, B., International symposium on wearable computers, 2009, assumes that the horizontal accelerations (p 149, 1. Introduction, left column) occur principally in the direction of the motion.

The signal is firstly projected into the horizontal plane by using the rest periods (minimum variance on each of the axes) to compute the vertical direction: in a rest period, the accelerometric signal represents solely the gravity field, that is to say the vertical direction. This direction is thereafter used to project the accelerometric signal into the horizontal plane.

A principal components analysis (PCA), that is to say a decomposition into eigenvectors and/or eigenvalues, is thereafter performed on the result of the projection so as to retrieve the direction of the displacement.

The article gives few elements, but announces five degrees of error over a course of 30 m, this being significant. We note by way of comment regarding this prior art that the principle according to which the horizontal accelerations are directed principally along the direction of advance is not satisfied since, as is seen subsequently, a pedestrian in a walking or running situation also generates accelerations perpendicular to the direction of advance. Depending on the user's gait, we thus have a superposition of acceleration components in the direction of walking and in the direction perpendicular to that of walking. Another variability factor which is not taken into account by the article is the position of the sensor. Moreover, the vertical direction identified in a rest period is no longer valid as soon as a motion which substantially modifies the orientation of the sensor housing is generated. It is thus appropriate to solve the problem of continuous estimation of the heading of the pedestrian on a terrestrial plane by virtue of the sensor data, and to do so continuously.

The article "Dead Reckoning from the pocket—An experimental study" by Ulrich Steinhoff and Bernt Schiele, Pervasive Computing and Communications (PerCom), 2010 IEEE International Conference on, Mar. 29, 2010, pertains to a comparative and experimental study of various approaches for estimating direction of displacement, solely for sensors in the pocket, by using a database, comprising 8 people and 23 traces.

The principles studied to determine the direction of displacement rest upon two principles:

a rotational approach: the idea is that the sensor "turns" about an axis which is orthogonal to the direction of displacement, this approach being targeted rather more on a sensor in a trouser pocket (the rotation axis is that of the femur or of the pelvis). We note that here, the author seeks the axes of rotation of the sensor rather than the directions of acceleration. He proposes a totally different approach from the previous article and this underlines the lack of universal solution in respect of the problem of the pedestrian, who carries or wears a motion sensor system whose position is unknown with respect to the body.

The article underlines the lack of robustness of the approach which is an approach based on eigenvalue decomposition: PCA ("principal component analysis") in 2D or 3D, filtered or unfiltered.

The idea here is that the inherent accelerations occur in the direction of displacement, the various procedures studied differ simply in the implementation of this principle. The 3D approach seeks the 3 principal components of the sensor signal, and then retains the 3rd (that is to say the one associated with the smallest of the eigenvalues) as being that which indicates the motion.

The two-dimensional or 2D approaches (PCA2D and PCA2Df) firstly project the signal into the horizontal plane, and then perform an eigenvector decomposition. Here, it is the most significant eigenvector (that associated with the largest eigenvalue) which is assumed to indicate the direction of walking. The article concludes that the PCA2Df approach (projection in the horizontal plane (2D) and then search for the principal component) with filtering at 5 Hz gives the best results with less than 5° error. Here again, it should be noted that a pedestrian in a walking or running situation generates accelerations in several directions on the horizontal plane, both in the direction of walking and also perpendicularly. The combination of the two, according to the user's gait, according to the position of the sensor does not afford any guarantee that this resulting horizontal acceleration is always oriented in the direction of walking.

Document US20130030754 seems to pertain to another approach. The orientation RRS, described by equation 1, is assumed known by virtue of the use of accelerometers and magnetometers (optionally gyrometers).

The projection of the sensor frame into the horizontal plane gives rise to a new frame called the p-frame, such that $z_{p\text{-}frame}$ points upwards, and the directions $x_{p\text{-}frame}$ and $y_{p\text{-}frame}$ are respectively collinear with the projection of $x_{sensor}$ and $y_{sensor}$ in the horizontal plane.

In this frame the acceleration in relation to $z_{p\text{-}frame}$ is neglected since it cannot discriminate a direction of displacement in relation to the horizontal plane, although it may be non-zero.

Thereafter it is assumed that the horizontal acceleration seen by the sensor is related solely to the displacement, and is therefore, by definition, carried by the direction $x_{traj}$.

The criterion used consists in searching for the angle which maximizes the acceleration in this direction, thus amounting (implicitly) to saying that the maximum acceleration is in the direction of the displacement. It should however be noted that a pedestrian in a walking or running situation generates accelerations in the direction of the trajectory and also in directions perpendicular to the trajectory and that the combination of the two can generate resultants in all directions and that the result is then completely uncertain.

This constitutes the core of the principle used for determining the orientation between the sensor and the trajectory. Provision is also made to correlate the accelerometer signals (or a combination of) with expected patterns corresponding to the various possible positions of the sensor (pocket, hand etc.) The search for the correlation maximum must make it possible to determine the position of the sensor (pocket, hand etc.). However, the articulation of this technique with the previous principle does not seem very clear. Without doubt the author introduces it since he notes that the previous procedure does not suffice on its own. Moreover, it seems complex to have firstly to classify a sensor position on the body in order to apply the procedure thereafter. Finally, the signals of the accelerometers are also used to detect the footsteps, a necessary and conventional technique for estimating the pedestrian's displacement.

Document WO2012141811 discloses estimation of the position based on selection from among possible positions, for each of which a likelihood is computed. The likelihood is computed on the basis of the data of the accelerometers, light sensors, and more generally all the available sensors, for example:

the walking/resting situation can be detected using the variance of the norm of the accelerometers;

the pitch and/or roll angles, computed on the basis of the averaged accelerometric data, give indications on the attitude of the device;

the angle θ=direction of motion, can be computed by eigenvalue decomposition (similar to the method of WO2012158751A1, without all the refinements for suppressing the transverse accelerations);

the use of coefficients MFCCs arising from voice recognition can aid classification; and the use of the optical sensor makes it possible to determine the number of occluded faces.

This multisensor fusion is complex, it requires a classification stage, itself error prone, in order to produce results.

Document WO2012158751 pertains essentially to an eigenvector and/or eigenvalue decomposition of the accelerometer signal except that the transverse accelerations are suppressed by a preprocessing comprising the following steps consisting in:

splitting the accelerations into horizontal and vertical accelerations;

suppressing the transverse accelerations by summing the accelerations of the "left" and "right" footsteps to obtain a zero resultant;

if the sensor is not centered, the resultant is non-zero, correlating the vertical accelerations with the horizontal delayed/advanced accelerations since it has been noted that the latter are phase-shifted by $+/-\pi/2$. The result is high for the so-called "displacement" accelerations and low for the transverse accelerations which are, however, also accelerations tied to the displacement, that is to say to the motion of the pedestrian in a walking or running situation; and the misalignment in angle (MA) is ultimately computed by eigenvalue decomposition.

This procedure is based only on the principle that the measured principal acceleration is along the direction of displacement and proposes a mode of selecting the accelerations along the direction of walking which is prone to error.

Document WO201316875 proposes a description of a complete system of pedestrian Navigation, centered on detecting the direction of the motion. It provides moreover for the use of radio (WIFI, GPS), of maps, of particle filter for the data fusion. The determination of the direction of the motion is much like patent US20130030754 and consists in finding the principal direction of the accelerations.

The idea is to extract the high-frequency components of the signal which are presumed to contain the inherent accelerations while the low-frequency components contain the gravity field. This operation is performed by a simple high-pass filtering of the accelerometer signals. At this juncture, the signals contain the accelerations in 3D space, that is to say in space of dimension 3×N, N being the number of measurements collected.

It is thereafter stated that the only relevant components are the horizontal accelerations, that is to say those which are orthogonal to the z axis of the reference frame, however it is not stated how these components are extracted (numerous techniques are possible for projecting the signals into the horizontal plane). Moreover, by definition of the low-frequency components, the procedure obtains an average direction of the vertical, which is not applicable to the motion as a whole. The extraction of the horizontal components does not therefore seem to be possible, if the motion comprises substantial rotations. The extraction of the horizontal components leads to a 2×N matrix.

On the basis of this matrix, the energy of the horizontal components of the accelerometer signal is computed, and then this energy signal is filtered. It is thereafter assumed that the energy is a maximum in the direction of the motion. This assumption is subject to caution, since, as we introduced previously, and as will be set forth again in more detail, a pedestrian in a walking or running situation generates at one and the same time accelerations in the direction of the trajectory, and also accelerations in the direction perpendicular to the trajectory. Here again, the assumption upon which the method rests is fragile.

Thereafter, one seeks the angle rotation which maximizes the energy in the first direction, (thus amounting to diagonalizing the energy matrix, that is to say performing an eigenvector decomposition) by solving a criterion.

This entails an analytical solution for the computation of the angle.

The principal weakness of all these approaches resides in their robustness, in particular in the assumption that the measured accelerations are carried by the direction of displacement, while the accelerations generated by the motion of a pedestrian in a walking or running situation generate transverse as well as longitudinal accelerations. Moreover, the robustness of the processing to the position of the sensor is not covered, we note that according to the position of the sensor, notably on the limbs such as the arms or the legs, the principles of computing the direction of the trajectory are not the same.

Indeed, whatever the procedure employed or the name given to it, all these approaches rely on the fact that the measured acceleration component is collinear with the direction of the motion. This assumption seems likely for the motions of the pedestrian's feet.

However, one can question the way in which this acceleration propagates from the feet to the other possible positions of the sensor: hands, pockets, breast etc., it is indeed apparent that these points of the body have directions of accelerations that are much less marked than those of the feet. We will indeed see hereinafter in the present patent application that the motion of the body is characterized by accelerations in the direction of walking and also in the direction perpendicular to that of walking. The power of these accelerations depends notably on the gait of the user and also on the position of the system of motion sensors on the body.

Moreover, other positions of the body are affected by motions that are not tied to the direction of displacement and that may engender relatively significant accelerations, such is for example the case for the swinging motions of the arm.

Finally, still for robustness reasons, the implementation of these principles involves processing a sufficiently long duration of signal so as to attenuate the effect of "spiky" spurious phenomena and extract a "mean" effect. A problem is that the notion of duration is in contradiction with that of real time which is central for the applications envisaged. The vertical directions are sometimes found by low-pass filtering (so as to extract the value of the direction of the gravity field), or as soon as the motions impressed on the sensor system comprise substantial rotational motions, this mean direction can no longer be used. This is true for cyclic walking motions. Moreover, for example, if a user changes the position sensor, it will only be possible for the new position to be determined accurately after a duration T such that the accelerometer signal collected over this duration contains several cycles of footsteps. The duration of a footstep being of the order of about a second, it is contemplated that durations of ten seconds are easily attained (analysis of the inherent accelerations over ten footsteps), or possibly more, according to the compromise adopted between the latency of the system and the desired accuracy.

SUMMARY OF THE INVENTION

The present invention responds to this problem through an innovative approach where the "sensor-to-traj" orientation is estimated continuously, by identifying the unknown orientation between the sensor (or set of sensors) and the trajectory of the pedestrian.

Hence, there is proposed a method for determining the orientation of the trajectory followed by a pedestrian, associated with a trajectory frame, with respect to a reference frame, said pedestrian being furnished with a sensor housing comprising a sensor assembly comprising at least one motion sensor, comprising the steps consisting in:
   generating data representative of the motion of the sensor housing on the basis of said sensor assembly in the reference frame,
   computing the value of a first rotation transformation operator representative of the orientation of the reference frame with respect to the trajectory frame, in such a way that the data representative of the motion which are thus obtained in the previous step, in the reference frame, and transformed by said first operator, exhibit at least one characteristic of a set of characteristics which are representative of signals of walking or running motion of a pedestrian and are expressed in the pedestrian frame.

In one embodiment, the reference frame is a terrestrial frame (tied to the Earth, to the ground), and said generation of the data representative of the motion of the sensor housing is obtained on the basis of said sensor assembly in the reference frame by applying a second rotation transformation operator, so as to determine the orientation of the trajectory frame in said Terrestrial frame.

Thus the invention makes it possible, when the reference frame ($R_R$) is tied to the Earth, to always know the orientation of the frame tied to the Earth with respect to the trajectory frame ($R_T$) of the trajectory followed by a pedestrian furnished with a sensor housing, and to be able to thus determine the heading of the pedestrian in the frame tied to the Earth, so as to apply the techniques of "dead reckoning".

In another embodiment of the invention, when the reference frame is tied to the sensor housing, the invention makes it possible to always know the orientation of a sensor housing with respect to the pedestrian (trajectory frame) furnished with a terminal comprising the sensor housing, and to be able to activate the terminal differently, as a function of this orientation. The terminal can be a mobile terminal such as a mobile telephone or touchpad tablet, gaming station, interactive spectacles, watch or other accessory provided with motion sensors and carried or worn by the pedestrian.

Hence, at any instant, data arising from the sensor assembly are available and represented in the reference frame (terrestrial) by virtue of the second rotation transformation operator, and the invention then makes it possible to determine the orientation of the terrestrial reference frame with respect to the frame of the trajectory followed by the pedestrian. This makes it possible to feed procedures of "dead reckoning" type and thus provide the heading of the trajectory actually followed by the pedestrian in the terrestrial frame. The sensor housing carried by the pedestrian can be oriented in any way whatsoever with respect to the pedestrian. A procedure is thus available which is capable of providing the heading of the pedestrian in the terrestrial frame, is robust to various positions of the sensor on the pedestrian, and is capable of adapting to changes of position.

According to one embodiment, the reference frame and the trajectory frame furthermore comprise a common axis, so that the first rotation transformation operator reduces to a rotation transformation operator in relation to the common axis.

By virtue of this common axis, it is simpler to determine the first operator, since it is then merely necessary to estimate a single unknown angle between the two reference frames and trajectory about this common axis. The first operator is reduced to a rotation in relation to a single axis. The procedures for computing the heading of the pedestrian are thereby simplified.

In one embodiment, the common axis is furthermore oriented along the direction of the terrestrial gravity, in such a way that the first rotation transformation operator is reduced to a rotation transformation operator in relation to a direction axis of the Terrestrial gravity.

Hence, several advantages can be described. Firstly, this employs frames conventionally used by the person skilled in the art, that is to say frames for which the vertical direction according to the terrestrial gravity is used as one of the axes of the frames utilized in the invention. Secondly, these frames comprising a vertical axis conform directly to the frames in which the characteristics of the motions of a pedestrian in a walking or running situation are conventionally described and it will then be easier to identify the conformity of the data representative of the motion of the pedestrian with respect to these characteristics, this constituting the core of the invention. As a third point, a single angle must be determined in order to completely determine the value of the first operator thereby rendering the procedure simpler whereas in the general case three angles or three parameters, depending on the mode of representation of the chosen rotation operators, must be determined. As a fourth point, this angle will be directly that of the trajectory in the terrestrial frame, since the trajectories and therefore the headings sought in the great majority of cases of utilization of the invention must be represented on maps or planes representing the geographical data along a horizontal plane, the vertical axis being perpendicular to these maps or to these planes.

According to one embodiment, the orientation of the sensor housing in the trajectory frame (or pedestrian frame) is determined by composition of the second operator with the first operator.

Hence, it is then possible to determine the orientation of the housing in the frame of the pedestrian and to activate functions in an automatic manner as a function of this orientation. It is then possible to determine according to this orientation whether or not functions of a mobile terminal, of interactive spectacles have to be activated. For example if it is determined that the user wearing interactive spectacles is looking in the direction of walking, it may be relevant to supply him with certain information whereas when he is looking in a different direction, it is appropriate to provide him with other information. In the same manner, if the screen of a terminal such as a mobile telephone is oriented with a certain orientation with respect to the pedestrian, certain display functions may be activated.

In one embodiment, a so-called "attitude platform" function is carried out, or loosely speaking "Inertial Measurement Unit", providing the value of the second operator which makes it possible to transform the data arising directly from the sensors and therefore charted in the frame of the sensor housing, into the reference frame tied to the Earth.

Hence, the second operator is computed directly on the basis of the data arising from the motion sensors present in the sensor housing and it is not necessary to call upon other sensors to estimate the value of the second operator. The device is thus completely autonomous.

According to one embodiment, the attitude platform function computes the second operator on the basis of a combination of data provided by accelerometric and/or gyrometric and/or magnetic inertial motion sensors present in the sensor housing.

Hence, there is no dependence on any other external equipment and the same sensor housing motion sensors can be used to determine the second operator, at each instant, thereby making it possible to determine the motion data in a reference frame tied to the earth.

In one embodiment said set of characteristics representative of motion signals of the chest, thorax or pelvis of the pedestrian, represented in a pedestrian frame defined by the antero-posterior, medio-lateral, and vertical pedestrian axes, said pedestrian frame then being tied to the trajectory frame comprises the following characteristics: the signal due to the translation motion in relation to the medio-lateral axis essentially exhibits power at the stride rate; the signal due to the translation motion in relation to the antero-posterior axis essentially exhibits power at the footstep rate; the signal due to the translation motion in relation to the vertical axis essentially exhibits power at the footstep rate; the signals due to the translation motions in relation to the vertical axis and in relation to the antero-posterior axis exhibit a substantially constant phase shift; the footstep rate is substantially twice the stride rate; the signal due to the rotation motion in relation to the medio-lateral axis essentially exhibits power at the footstep rate; the signal due to the rotation motion in relation to the antero-posterior axis essentially exhibits power at the stride rate; and the signal due to the rotation motion in relation to the vertical axis essentially exhibits power at the stride rate.

Hence, for sensor housing positions for which the motions measured by the motion sensors are tied to those of the chest, of the thorax or of the pelvis of the pedestrian, it is possible to design procedures or methods combining one or more characteristics. Utilizing a characteristic from among the set of characteristics makes it possible to design simple procedures for estimating the unknown rotation transformation operator, the subject of the invention, whereas the combining of several characteristics makes it possible to design procedures which are more complex and robust since several criteria are combined. Moreover, it is possible to select one or more criteria according to the nature of the motion sensors available in the sensor housing. The procedures can notably utilize the antero-posterior accelerations, the medio-lateral accelerations, which are suitable if the sensor housing possesses an accelerometer, the rotations in relation to the medio lateral axis, the rotations in relation to the antero-posterior axis, which are suitable if the sensor housing possesses rotation sensors such as gyrometers. Among the characteristics, it should also be noted that these motion characteristics occur at particular frequencies (those of the stride or that of the footstep). It is then possible to finely select the characteristic or characteristics to be utilized so as to determine the operator representative of the orientation of the reference frame with respect to the pedestrian frame, which is itself equal to the trajectory frame.

According to one embodiment said set of characteristics representative of motion signals of a free limb of the pedestrian (such as the arms or the legs) represented in a pedestrian frame defined by the antero-posterior, medio-lateral, and vertical pedestrian axes, said pedestrian frame being tied to the trajectory frame comprises the following characteristics: the signal due to the translation motion in relation to the Antero-Posterior axis essentially exhibits power at the stride rate; the signal due to the translation motion in relation to the vertical axis essentially exhibits power at the footstep rate; the signal due to the rotation motion in relation to the medio-lateral axis essentially exhibits power at the stride rate; the rotation signal due to the rotation motion in relation to the vertical axis essentially exhibits power at the stride rate.

Thus, for sensor assembly positions for which the motions sensed are tied to those of a free limb of the pedestrian, notably their arms or their legs, it is possible to design procedures for estimating the rotation transformation operator representative of the orientation of the reference frame with respect to the frame of the pedestrian, that is to say, of the trajectory frame, by combining one or more of the listed characteristics. The combining of several criteria makes it possible to render the trajectory estimation procedure more robust. These procedures can notably utilize the antero-posterior accelerations particularly suitable when the acceleration measurement is available, the rotations in relation to the medio lateral axis, particularly suitable when a rotation sensor, such as a gyrometer, is available, also knowing in addition the frequencies at which these motions are situated and/or simultaneous combinations of all of these properties.

In one embodiment, said characteristic or said characteristics are selected from the set of characteristics of the motions of the chest of the pedestrian such as described previously or from the set of characteristics of the motions of a free limb of the pedestrian such as described previously, on the basis of an indicator characterizing the nature of the mechanical link between the sensor housing and the pedestrian.

Thus, it is possible to implement the appropriate set of characteristics corresponding to the indicator and to retrieve the trajectory of the pedestrian. When the sensor housing is bound solely to the chest, such as for example interactive spectacles, use will be made exclusively of characteristics tied to the motions of the chest of the pedestrian. When the sensor housing is bound solely to the swinging arm, such as for a watch equipped with motion sensors, use will be made exclusively of characteristics tied to the arm of the pedestrian. In the case where both situations are possible, one or the other set of characteristics will be used, according to an indicator representative of the manner of carriage of the sensor housing.

According to one embodiment, said data representative of the motion of the sensor housing in the reference frame are generated on the basis of at least one accelerometer with at least two measurement axes, and said characteristic is that the acceleration signal due to walking/running along the principal direction of the trajectory or along the antero-posterior axis essentially exhibits a power spike at the footstep rate.

Stated otherwise, a rotation transformation operator in relation to the vertical axis $Q_{RT}$ is computed in such a way that the acceleration thus given in the horizontal plane of the reference frame and transformed by said rotation operator in relation to the vertical axis, essentially exhibits a power spike at the footstep rate along the principal axis of the trajectory.

Thus, a single distinctive characteristic of the pedestrian walking signal is utilized, the analyzed signal is restricted to the footstep frequency and renders the procedure more accurate, since it is known that a pedestrian's acceleration signal, at the footstep frequency, is essentially in the direction of the trajectory, and the procedure remains simple to implement.

As a variant, said data representative of the motion of the sensor housing in the reference frame are generated on the basis of at least one accelerometer with at least two measurement axes, and said characteristic is that the acceleration signal due to walking/running along the perpendicular and horizontal direction to the principal direction of the trajectory or stated otherwise along the medio-lateral axis essentially exhibits a power spike at the stride rate.

Stated otherwise, the rotation transformation operator in relation to the vertical axis $Q_{RT}$ is computed so that the acceleration thus given in the horizontal plane of the reference frame and transformed by said rotation operator in relation to the vertical axis essentially exhibits a power spike at the stride rate along the medio lateral axis of the pedestrian (that is to say perpendicular and horizontal to the principal axis of the trajectory).

Thus, a single distinctive characteristic of the pedestrian walking signal is utilized, the analyzed signal is restricted to the stride frequency and renders the procedure more accurate, since it is known that a pedestrian's acceleration signal, at the stride frequency, is essentially in the medio-lateral direction and the procedure remains simple to implement.

In one embodiment, the rotation transformation operator in relation to the vertical axis is determined so that the phase shift between the acceleration due to walking/running measured along the vertical axis and the acceleration due to walking/running and transformed by said operator along the axis AP lies between 0 and $\pi$, and equals $\pi/2$ in particular.

Thus, it is possible to determine the sense of walking and not only the direction of walking.

According to one embodiment, the rotation transformation operator in relation to the vertical axis is determined on the basis of the amplitudes, at the footstep frequency, of the two horizontal components of the acceleration signal in the reference frame.

Hence, the angle of the rotation transformation operator is determined on the basis of the two horizontal components of the acceleration signal in the reference frame, thereby making it possible on the one hand to find an angle which maximizes the amplitude of the acceleration at the footstep frequency in the direction of walking and minimizes the amplitude of the acceleration at the footstep frequency in the direction perpendicular to that of walking. It is also possible to provide a confidence factor, by determining for example a ratio between the acceleration amplitude thus found in the direction of walking and the acceleration amplitude thus found in the direction perpendicular to that of walking. When this ratio is large with respect to 1, the confidence factor in the estimated angle is large, when it is close to 1 (and a fortiori smaller than 1) the confidence factor is small. It is possible to construct other confidence factors, depending on the amplitudes found in the directions AP and ML. For the analysis of the signals at the footstep frequency, the more fully the power or the amplitude of the signals transformed by the rotation transformation operator from the reference frame to the pedestrian frame will be found along the axis AP (and therefore little amplitude or power along the axis ML), the better the confidence will be.

In one embodiment, the rotation transformation operator in relation to the vertical axis is determined on the basis of the amplitudes, at the stride frequency, of the two horizontal components of the acceleration signal in the reference frame.

Thus, the angle of the rotation transformation operator is determined on the basis of the two horizontal components of the acceleration signal in the reference frame, thereby making it possible on the one hand to find an angle which maximizes the amplitude of the acceleration at the stride frequency in the direction perpendicular to that of walking and minimizes the amplitude of the acceleration at the stride frequency in the direction of walking. It is also possible to provide a confidence factor, by determining for example a ratio between the acceleration amplitude thus found in the direction perpendicular to walking and the acceleration amplitude thus found in the direction of walking. When this ratio is large with respect to 1, the confidence factor in the estimated angle is large, when it is close to 1 (and a fortiori smaller than 1) the confidence factor is small. It is possible to construct other confidence factors, depending on the amplitudes found in the directions AP and ML. In the case where the signals are analyzed at the stride frequency, the more fully the power or the amplitude of the signals transformed by the rotation transformation operator from the reference frame to the pedestrian frame is found along the axis ML (and therefore little amplitude or power along the axis AP), the better the confidence will be.

According to one embodiment, said data representative of the motion of the sensor housing in the reference frame are generated on the basis of at least one accelerometer with at least two measurement axes, and the two previous characteristics are combined: (i) the acceleration signal due to walking/running along the principal direction of the trajectory (or along the antero-posterior axis) essentially exhibits a power spike at the footstep rate, and (ii) the acceleration signal due to walking/running along the perpendicular and horizontal direction to the principal direction of the trajectory or stated otherwise along the medio-lateral axis essentially exhibits a power spike at the stride rate.

It is naturally possible and advantageous, to simultaneously utilize the two amplitudes of the accelerations in the horizontal plane at the stride frequency and at the walking frequency, by combining the criteria established previously for one and the other characteristic of the motions at the stride frequency and at the walking frequency. The optimal angle is found when the 2 horizontal accelerations at the footstep frequency (AccX(Footstep) and AccY(Footstep)) and the 2 horizontal accelerations at the stride frequency (AccX(stride) and AccY(stride)), transformed by the rotation transformation operator in relation to the vertical axis are transformed respectively for (AccX(Footstep) and AccY (Footstep)) into 2 horizontal components at the footstep frequency (AccAP(Footstep) and AccML(Footstep)) such that the first exhibits a maximum amplitude along the Antero-Posterior axis and the second a minimum amplitude along the Medio Lateral axis and for (AccX(stride) and AccY(stride)), into 2 horizontal components at the stride frequency (AccAP(Stride), AccML(Stride)) such that the first exhibits a minimum amplitude along the Antero-Posterior axis and the second a maximum amplitude along the Medio-Lateral axis.

It is also possible to form confidence criteria by computing for example ratios between the amplitudes AccAP (footstep) and AccML(footstep) which must be large compared with 1 for high confidence in the estimated angle, and the amplitudes AccML(Stride) and AccAP(stride) which must be large compared with 1 for high confidence in the estimated angle. Other confidence criteria can be built, which measure compliance with the distinctive characteristics which are utilized. The more the characteristic is complied with, the better is the confidence in the estimation of the rotation-wise operator. In the subsequent description, other criteria are presented. Stated otherwise, the rotation transformation operator in relation to the vertical axis $Q_{RT}$ is computed in such a way that the two characteristics are utilized, namely: (i) the acceleration thus given in the horizontal plane of the reference frame and transformed by said rotation operator in relation to the vertical axis essentially exhibits a power spike at the footstep rate along the antero-posterior axis of the pedestrian (that is to say along the principal axis of the trajectory) and (ii) the acceleration thus given in the horizontal plane of the reference frame and transformed by said rotation operator in relation to the vertical axis essentially exhibits a power spike at the stride rate along the medio lateral axis of the pedestrian (that is to say perpendicular and horizontal to the principal axis of the trajectory).

According to one embodiment, the frequency of the footsteps or of the stride is determined on the basis of the acceleration signal in relation to the vertical axis.

Thus, independently of the position and of the orientation of the sensor housing and therefore of the manner of carriage of the sensor housing by the pedestrian, it is possible to determine the frequency of the footsteps, since the acceleration signal in relation to the vertical is essentially characterized by power at the frequency of the footsteps.

In one embodiment, the amplitude of the acceleration signal at the frequency of the footsteps in the horizontal plane of the reference frame is determined by filtering of the acceleration signal in the horizontal plane of the reference frame, said filtering being characterized by its impulse response taken equal to the acceleration signal in relation to the vertical direction in the reference frame. This technique is called matched filtering, intercorrelation, or synchronous detection. Hence, this embodiment makes it possible to compute perfectly the amplitude of the acceleration signal in the horizontal plane at the frequency of the footsteps and provides the phase shift between the acceleration signal in relation to the vertical (which essentially exhibits power at the frequency of the footsteps) and in relation to the horizontal at the frequency of the footsteps.

In one embodiment, said data representative of the motion of the sensor housing in the reference frame are generated on the basis of at least one gyrometer with at least two measurement axes, and for which at least one characteristic from among said characteristic or said characteristics is that the rotation speed signal due to walking/running along the medio lateral axis essentially exhibits a power spike at the stride rate.

In one embodiment, when the motions impressed on said sensor assembly are essentially due to the motion of the chest-thorax-pelvis assembly of the pedestrian, use is made at least of the characteristic according to which the motion signal in translation at the footstep frequency essentially exhibits power along the antero-posterior axis, and, when the motions impressed on said sensor assembly are essentially due to the motion of a free limb of the pedestrian, use is made at least of the characteristic according to which the motion signal in rotation at the stride frequency essentially exhibits power in relation to medio lateral.

BRIEF DESCRIPTION OF THE DRAWINGS

The invention will be better understood on studying a few embodiments described by way of wholly non-limiting examples and illustrated by the appended drawings in which.

DETAILED DESCRIPTION

In the set of figures, the elements having the same references are similar.

Figure 1:
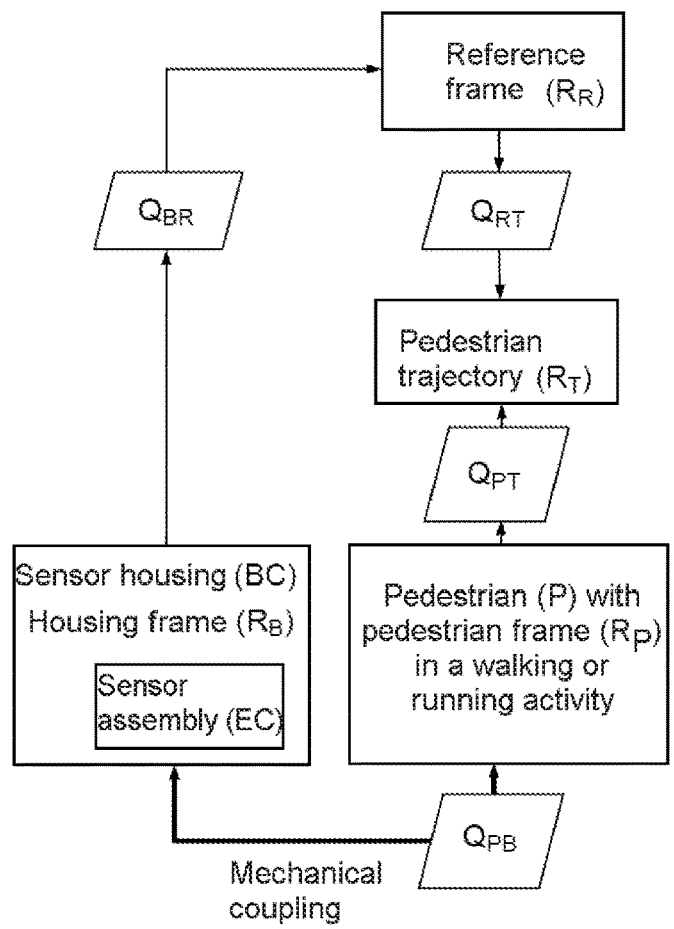
FIG. 1 schematically illustrates the pedestrian system, with the various frames, for a better understanding of the method according to an aspect of the invention.

FIG. 1 schematically illustrates a pedestrian system and the manner of operation thereof according to an aspect of the invention, and notably the various frames used and their relations.

A sensor housing BC comprises a sensor assembly EC furnished with at least one motion sensor. A housing frame $R_B$ is associated with the sensor housing BC.

A reference frame $R_R$ is also determined. A rotation transformation operator for rotating between the housing frame $R_B$ and the reference frame $R_R$ is denoted $Q_{BR}$. This operator may evolve over time.

A pedestrian P is furnished with a pedestrian frame $R_P$. A trajectory frame $R_T$ is associated with the trajectory followed by the pedestrian P. An operator $Q_{PT}$ between the trajectory frame and the pedestrian frame is defined. This operator is defined by convention of the pedestrian frame $R_P$ and trajectory frame $R_T$.

The pedestrian P and the sensor housing BC are of course tied by a mechanical coupling.

The present invention makes it possible to determine the orientation of the trajectory followed by the pedestrian P, associated with the trajectory frame $R_T$, with respect to the reference frame $R_R$. This orientation is denoted $Q_{RT}$ and may evolve over time.

Depending on the choice of the reference frame $R_R$, the applications of the invention can differ.

When the reference frame $R_R$ is tied to the sensor housing BC, the invention makes it possible to always know the orientation of the sensor housing BC with respect to the pedestrian P (trajectory frame $R_T$) furnished with a terminal comprising the sensor housing BC, and to be able to activate the terminal differently, as a function of this orientation. The terminal can be a mobile terminal such as a mobile telephone or touchpad tablet, gaming station, interactive spectacles, or bracelet worn on the wrist, etc.

The invention also makes it possible, when the reference frame $R_R$ is tied to the Earth, to know the orientation of the frame tied to the Earth in the trajectory frame $R_T$ and to be able to thus determine the heading of the pedestrian, an essential component for being able to apply the techniques of "dead reckoning".

The method comprises the steps consisting in:
  generating data representative of the motion of the sensor housing BC on the basis of said sensor assembly in the reference frame $R_R$,
  computing the value of a first rotation transformation operator $Q_{RT}$ representative of the orientation of the reference frame $R_R$ with respect to the trajectory frame $R_T$, in such a way that the data representative of the motion which are thus obtained in the previous step, in the reference frame $R_R$, and transformed by said first operator $Q_{RT}$, exhibit at least one characteristic of a set of characteristics that are representative of motion signals of a pedestrian and are expressed in the pedestrian frame.

The general objective is to determine the direction of the trajectory followed by a pedestrian, at each instant, said trajectory being characterized by a trajectory frame at the current instant denoted $R_T$ (cf FIG. 1), in a reference frame (frame $R_R$, often the Terrestrial frame). The direction sought is provided by the orientation of the trajectory frame in the reference frame for the current instant, that is to say by giving a rotation transformation operator $Q_{RT}$ for rotating between the two frames. Giving the successive operators $Q_{RT}$ over time, associated with giving the pedestrian's successive speeds over time, makes it possible for example to plot the pedestrian's trajectory. This trajectory estimation technique based on giving a heading and a speed is commonly called "Dead Reckoning" or "Deduced Reckoning", often denoted DR. We are concerned here with the problem of estimating the heading of the pedestrian at each instant, without being concerned with the speed.

The complexity of the problem posed stems from the fact that we have no direct measurement of the heading of the pedestrian in the reference frame $R_R$, but more indirectly we do have measurements arising from motion sensors for a housing BC carried by the pedestrian. Indeed, the position and the orientation of the housing BC on the pedestrian are not known. Thus, even if it may be considered that the orientation of the housing BC with respect to the reference frame $R_R$ is known, or more probably or practically, can be obtained on the basis of the motion sensors present in the housing, it is not possible to determine the orientation of the pedestrian (and therefore of his trajectory) in the reference frame $R_R$.

It is considered that the pedestrian is furnished with a sensor housing BC comprising motion sensors and that he is moving by walking or running with the housing. The housing BC comprises for example, sensors of accelerometer and/or magnetometer and/or gyrometer type, which are commonly available with three measurement axes. Thus an accelerometer A directly provides the acceleration field which can be represented by a vector with three components. The same goes for a magnetometer M, which directly provides the magnetic field, representable by a vector with three components. Likewise, a gyrometer G provides the rotation speeds in relation to its three axes, the rotation speed is also representable by a three-dimensional vector. These three sensors are commonly available and mobile telephones or smartphones, or touchpad tablets are now commonly equipped with them. The sensors provide their measurements in the frame of the sensor or frame of the housing BC.

The most emblematic portable device is a mobile telephone or a tablet, or indeed a laptop computer. It can also be any other object equipped with motion sensors, such as interactive spectacles, or accessories carried or worn by the user. Such sensors are now commonly embedded in mobile telephones, tablets or computers. Interactive spectacles can easily be equipped with such sensors. The electronic accessories carried or worn by a person are also commonly equipped with motion sensors, notably those which are intended for monitoring people's physical activity. Specialized radio terminals for isolated workers also form part of the devices in which such sensors may be embedded. The invention applies to any electronic device carried or worn by a person and equipped with at least one motion sensor. All the electronic devices cited are moreover provided with computation means, means of connecting and of communicating data to computing networks. The entire computation implementing the invention can be carried out aboard the electronic device, without needing any communication with a network. It is one of the advantages of the invention to thus be able at each instant to estimate, solely on the basis of the measurements of motion sensors embedded in the device, the heading of the person carrying or wearing it so as to estimate his trajectory. One is thus independent of any infrastructure.

To fix matters it is possible to contemplate an emblematic scenario of the present invention, in which the pedestrian is furnished with a mobile telephone or smartphone comprising or being considered to be a sensor housing BC, equipped with motion sensors, and that the objective consists in estimating the trajectory of the pedestrian with the aid solely of the motion sensors present aboard the sensor housing BC or smartphone. Giving, at each instant, the velocity vector of the pedestrian in the reference frame makes it possible to apply the technique of Dead Reckoning. The velocity vector can be decomposed into a modulus (the speed of displacement of the pedestrian in the reference frame) and the datum regarding his orientation in the reference frame $R_R$. We are principally concerned with the determination of this orientation information which is very complex, insofar as the pedestrian is free to carry his mobile telephone in various ways and that thus the orientation of the mobile telephone does not determine the heading of the trajectory. In the majority of industrially relevant cases, the pedestrian moves on horizontal planes with respect to a terrestrial frame. In this type of scenario, providing the orientation of the velocity vector of the pedestrian in the reference frame $R_R$ is then limited to the provision of a single angle of heading of his trajectory on the horizontal displacement plane.

The motion sensors principally considered (A, G and M) provide three-dimensional measurement vectors. The sensors are rigidly tied to the sensor housing BC. It is therefore possible to consider that the sensors thus deliver their vector measurements in one and the same frame, tied to this sensor housing BC. The person skilled in the art is aware of the procedures which make it possible to correct, if necessary, possible misalignments between the axes of the sensors proper and which thus provide the measurements of the sensors in this same, single housing frame $R_B$. For small misalignments, the invention can nevertheless be applied.

As was mentioned previously, techniques are known for providing the orientation of the housing BC in the reference frame $R_R$, when this reference frame is defined as tied to the Earth. It should indeed for example be noted that the sensors A, G, M, conventionally present in smartphones make it possible to construct an attitude platform or "Inertial Measurement Unit" (acronym IMU) which, for example, through a sensor data fusion technique, provides the orientation of the housing frame $R_B$ with respect to a reference frame tied to the Earth, that is to say the rotation transformation operator $Q_{BR}$. Numerous combinations are possible between the sensors A, G, M so as to arrive at a satisfactory estimation of $Q_{BR}$. If the housing is provided with very efficacious sensors, for example a low-drift gyrometer with very good calibration, it is possible to estimate at each instant this orientation with respect to a Terrestrial frame solely on the basis of the gyrometer over a horizon of several tens of minutes, or indeed of hours. Note, however, that the problem of not knowing the heading of the pedestrian remains, since the orientation, even accurate, of the sensor housing does not in any way determine the heading of the trajectory.

Figure 2:
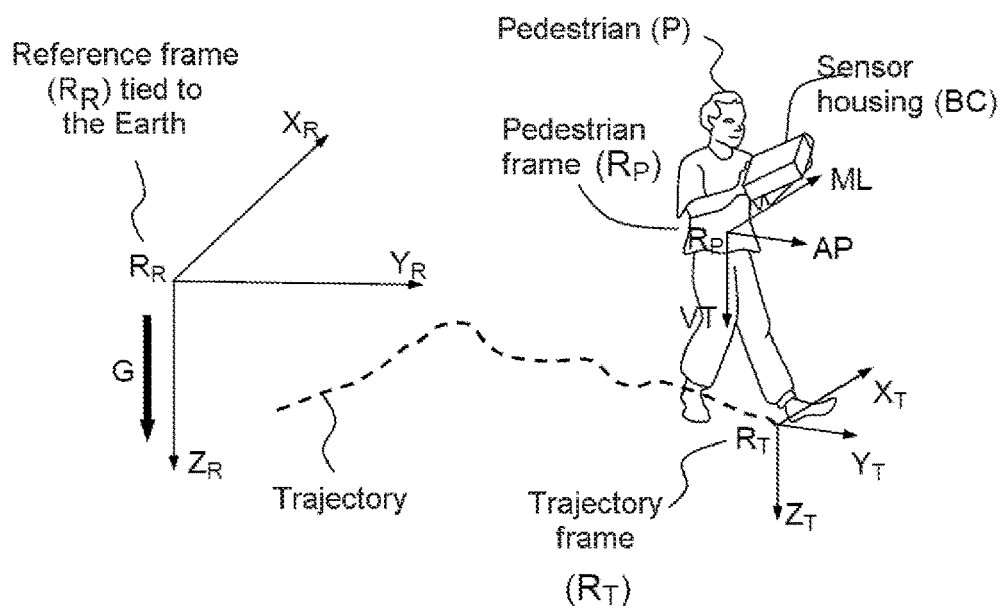
FIG. 2 schematically illustrates the various frames used.

A rotation transformation operator can be represented in various forms, a rotation matrix, a quaternion, several rotation matrices operated in series, for example according to the Euler or Cardan conventions. In FIGS. 1 and 2, a view of the various frames and of the transformation operators between the frames. Giving a rotation transformation operator for rotating between two frames makes it possible to transform a vector from one frame to the other, in one direction and in the opposite direction. The person skilled in the art can use the suitable formalism in order to represent these rotation transformation operators. A rotation transformation operator is completely defined by giving the rotation axis (given by a unit vector with two independent parameters) and the angle of the rotation i.e. three independent parameters.

Figure 3:
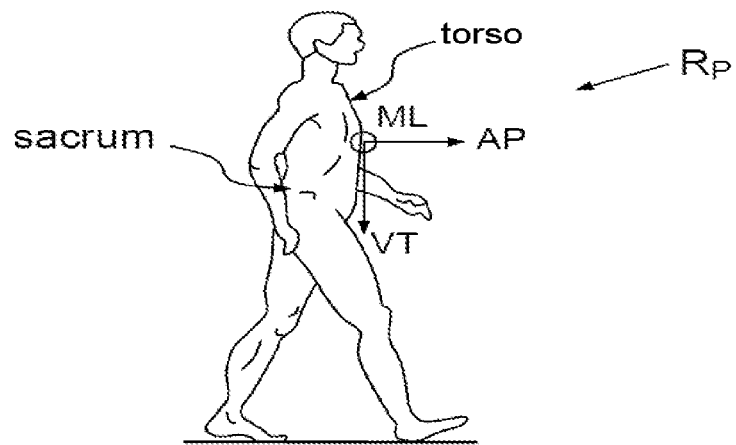
FIG. 3 schematically illustrates a pedestrian and his associated pedestrian frame.

To complete the conventions regarding frames and notation, it is considered that the pedestrian is furnished with a pedestrian frame $R_P$ according to FIG. 3. Naturally any other frame is possible, and does not restrict the generality of the present description. It is however simple and we will advantageously use such a formalism to utilize a particular, but commonly used, pedestrian frame. The pedestrian is furnished with a pedestrian frame denoted $R_P$ defined by a first Antero-Posterior axis AP, a second Medio-Lateral axis ML and a third Vertical axis VT (as illustrated in FIG. 3). The three-axis system (ML, AP, VT) forms the pedestrian frame $R_P$. During a "normal" walking or running activity, it may be considered that the Antero-Posterior axis AP is directed in the sense of the trajectory (cf FIG. 2). Thus, for example, the fact of knowing the orientation of the trajectory frame $R_T$ in the reference frame $R_R$ is equivalent to knowing the orientation of the pedestrian frame $R_P$ in the reference frame $R_R$, since naturally, the pedestrian has a trajectory directed along the Antero-Posterior axis AP. The two frames: pedestrian frame $R_P$ and trajectory frame $R_T$ are consequently equivalent, optionally to within a constant rotation operation. This rotation transformation operator is denoted $Q_{PT}$. The rotation transformation operator $Q_{PT}$ is constant and known. For example, according to the notation and conventions of FIG. 2, it is equal to the identity: (AP, ML, VT)=($X_T$, $Y_T$, $Z_T$). It will be possible to refer to FIG. 1 which presents, in block diagram form, the various frames and the relationships between the various frames useful to the understanding of the present invention.

To solve the problem of determining the orientation of the trajectory of the pedestrian P, if the mechanical coupling between the sensor housing BC and the pedestrian P were known (by giving an operator for rotating between the housing frame RB and the pedestrian frame RP which we denote by $Q_{PB}$), we could easily find the orientation $Q_{RT}$ of the trajectory by composition of the orientation $Q_{BR}$ of the housing BC in the terrestrial frame $R_R$ with this rotation operator $Q_{PB}$. However, it is assumed that this orientation is unknown, since the pedestrian can carry his housing (for example his smartphone) in various a priori unknown ways, and he can moreover change mode of carriage during use.

The rotation operator $Q_{RT}$ is computed by composition of the rotation operator $Q_{PB}$ with the rotation operator $Q_{BR}$.

As specified in the previous paragraph and recalled again subsequently, procedures well known to the person skilled in the art make it possible to estimate the orientation $Q_{BR}$ of the sensor housing BC in the reference frame $R_R$. The problem of estimating the orientation $Q_{RT}$ of the trajectory in the reference frame $R_R$ is therefore equivalent to that of determining the orientation of the housing BC with respect to the trajectory (or to the pedestrian frame $R_P$, which are equivalent), $Q_{PB}$. If it is known how to determine the rotation operator $Q_{RT}$ then it is possible to compute the rotation operator $Q_{PB}$, and vice versa. The present invention makes it possible to solve both problems. The determination of the trajectory of the pedestrian P exhibits all sorts of dividends in regard to locating him at each instant, by applying dead reckoning techniques.

The invention therefore exhibits a major benefit, notably in regard to cases in which the conventional principles of location are not operational. The most widespread conventional system is GPS ("Global Positioning System") based on utilizing the so-called GNSS or GLONASS (for "global navigation satellite system") principle. GPS makes it possible to provide an absolute location at each instant on the basis of the reception of signals generated by satellites in orbit around the Earth. It makes it possible to locate vehicles, pedestrians, etc. However, for situations in which the GPS signal is not satisfactory, or absent, the satellite-based location is not correct or unavailable. Thus urban situations for which the presence of buildings impedes GPS reception are dubbed Canyon Effect. The mobile object to be located is no longer in direct sight of a sufficient number of satellites and its location is then no longer satisfactory. Worse, in indoor situations, GPS signals are not available and location is not possible.

The invention makes it possible to feed or provide with input data an estimator of the trajectory followed by the pedestrian P by the Dead Reckoning procedure, while providing the heading of the pedestrian independently of the manner of carriage of the sensor housing. The invention makes it possible to base oneself solely on the data of motion sensors for a housing BC carried by the pedestrian P and operating even indoors, without any instrumentation of the environment. We note also that the dead reckoning technique proposed makes it possible to supplement an inaccurate absolute location or one which is available from time to time by interpolating between the absolute position measurements provided by other systems. It is then also possible, for example, to limit calls to absolute positioning techniques and thus to reduce the electrical consumption of positioning systems by using the present invention. The present invention can therefore, for example, participate in a gamut of so-called Assisted GPS technologies where the GPS location solution is assisted by instantaneous trajectory data. The present invention also constitutes a significant supplement to radio-based location techniques of WIFI type for example which are by nature inaccurate.

An assumption is that the sensors are carried by a human being, and that here the latter's activity is walking (or running), it is possible to expect a little more information induced by the walking scheme (or "walking"), and therefore specific motions and motion measurements are induced on the housing's motion sensors. Stated otherwise, the motions impressed on the sensor housing BC, due to the manner of carriage of the sensor housing BC by the pedestrian, and due to the walking or running activity of the pedestrian P, are not random and exhibit distinctive characteristics. These particular motions are impressed on the sensor housing BC and are therefore measured by its embedded motion sensors.

In what follows, this assumption is considered to be realized (the sensors are carried by the pedestrian, who is walking or running).

As first consequence, and in accordance with the foregoing, i.e. that the pedestrian is a human being who is walking (or running), there is therefore a natural direct relation between the orientation of his body within the reference framework and the trajectory that he is following. As shown by FIG. 3 or FIG. 2, because of the human morphology, it may be assumed that the heading of the trajectory is ensured by the Antero-Posterior AP direction of his body.

Therefore, the problem to be solved to determine the unknown rotation operator $Q_{RT}$ amounts to solving the problem for the unknown rotation operator which ties the trajectory frame $R_T$ and the frame of the body of the user or pedestrian frame $R_P$, since it is assumed that the orientation of the pedestrian frame provides the heading of the trajectory.

The proposed solution operates under this assumption (the heading of the trajectory is equal or equivalent to the heading of the antero-posterior axis), which is not a limitation for a normal case of walking or running. The housing frame $R_B$ can be tied to the reference frame $R_R$ by the rotation transformation operator $Q_{BR}$, since it is considered that the sensor housing BC is able to provide its orientation in the reference frame $R_R$ via the conventional IMU attitude computation, known to the person skilled in the art.

Figure 4:
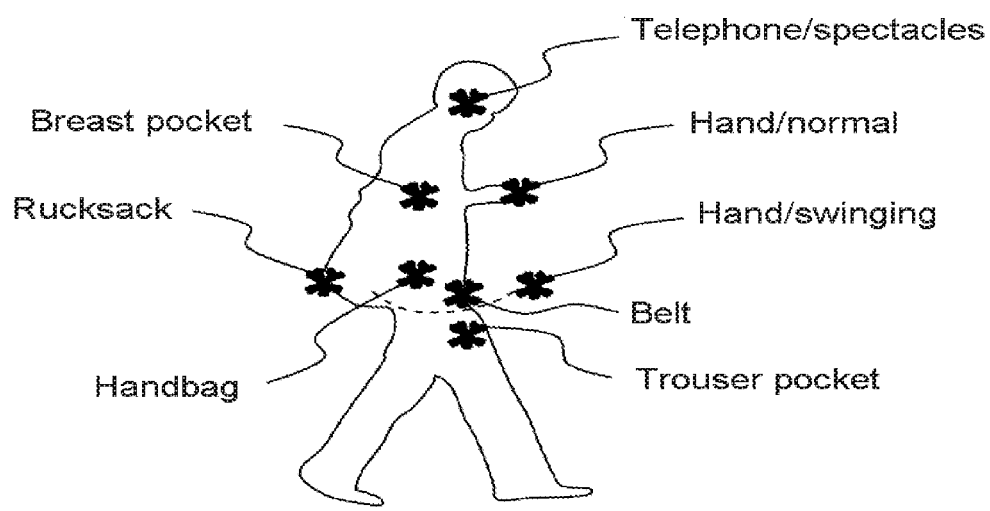
FIG. 4 schematically illustrates the various positions of the sensor housing.

A carrier pedestrian bearing a motion sensor housing BC and performing a walking or running activity is considered. The sensor housing BC can be carried in the hand, for example for a smartphone or a tablet, in consultation mode (typical use of a smartphone or tablet), or carried in the hand while swinging, or be placed in a pocket tied to the thorax, in a trouser pocket, in a bag carried slung over the shoulder, or in a rucksack. It can also be carried in the hand in telephone mode, thus close to the ear. These positions are nonlimiting examples. They remain valid for other electronic devices such as interactive spectacles (then the manner of carriage is tied to the head of the user), electronic accessories. These various cases are illustrated in FIG. 4. Without restricting the list of possible positions to the above list, this list shows the extent of the generally noted positions. Furthermore, over time, the manner of carriage of the sensor housing BC can vary.

Figure 5:
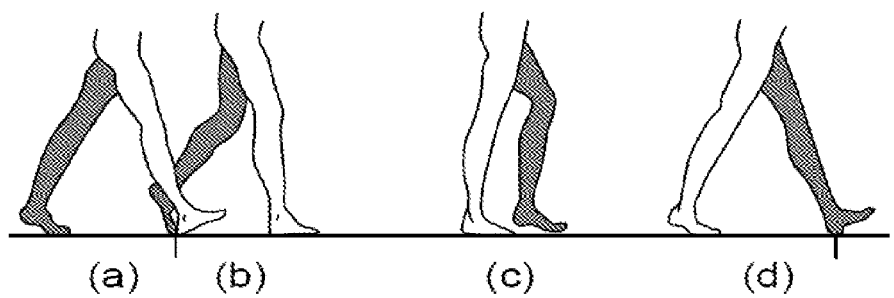
FIG. 5 schematically illustrates a period of the walking or stride, a stride being composed of two footsteps.

As disclosed by patent FR2942388, the walking activity generates motions some characteristics of which are distinctive. A stride is the basic period of walking (or running) reproduced substantially identically over time. Each stride comprises the movement of the left foot, and then of the right foot (or in the reverse order, according to convention). The term stride will be used to designate the basic period of walking (or running) and the term footstep will be used to describe the period of the signal corresponding to the alternate planting of the right foot and of the left foot. As illustrated in FIG. 5, the footstep rate is twice the stride rate.

The frequency generally noted for a walking activity is restricted to the band of frequencies from 0.5 to 2 Hz. The high frequency is bigger if one desires to include running activities. It will therefore be commonplace and useful to restrict the motion signals studied (for walking/running) to this band of frequencies, for example through a bandpass filter.

It is therefore relevant to note that the motion signals sensed by a sensor substantially bound to the thorax or to the pelvis of a pedestrian then exhibit two power spikes at two distinctive frequencies, one related to the stride rate, the other related to the motions of each leg, the footstep rate. For non-pathological, symmetric walking gaits, these two frequencies are related in a ratio equal to about two.

It is therefore known that the walking activity induces motions with distinctive characteristics. We propose to give a description thereof in the pedestrian frame $R_P$ such as defined in FIG. 3. Indeed, for example according to FR2942388, it is noted that the motions of the thorax in translation along the Medio Lateral ML axis are essentially marked by motions at the stride frequency, that the motions of the thorax in the directions of the Vertical VT and Antero-Posterior AP axes are essentially marked of the motions at the footstep rate. Thus, (i) the translation motion signals due to walking/running along the Medio Lateral axis ML essentially exhibit a power spike at the stride rate (they exhibit little power at the footstep frequency). (ii) The translation motion signals due to walking/running along the Vertical VT and Antero-Posterior AP axes essentially exhibit a power spike at the footstep rate (they exhibit little power at the stride rate). (iii) The power spike of the signals due to the translation motion in relation to the Medio Lateral axis ML is situated at a frequency half as large as the power spike of the signal of the translation motion in relation to the Antero-Posterior AP or Vertical VT axes. Finally, we also note that the translation motion signals in relation to the axis VT and AP (both essentially comprising power at the frequency of the footsteps) exhibit a constant phase shift of an angle of about $\pi/2$.

It is thus noted that there exists an item of information related to the orientation of the body, which is present on motion signals induced by the motions of the pedestrian's body. Thus, when the motion signals sensed by the motion sensors are expressed in the housing frame $R_B$, information is available related to the orientation of the body with respect to the sensor housing BC. Likewise, if the motion signals sensed by the motion sensors are expressed in another frame (for example the reference frame $R_R$), then information is available related to the orientation of the body of the pedestrian with respect to the reference frame $R_R$. Thus, more specifically, and to fix matters by using a canonical case, when a housing equipped with a translation motion sensor with three axes (X,Y,Z), such as an accelerometer which is commonly employed as sensor of motions tied to translations, is fixed or bound to the thorax or pelvis, and when the frame of the housing BC in which the sensor delivers its signals is aligned with the pedestrian frame $R_P$ (ML, AP, VT), the signal of the motion sensor in relation to the axis X exhibits all the distinctive properties of the motion signal in relation to the Medio-Lateral axis ML (i.e. essentially a power spike at the stride frequency), the signal of the motion sensor in relation to the axis Y exhibits all the distinctive properties of the motion signal in relation to the Antero-Posterior axis AP (i.e. essentially a power spike at the footstep frequency), the signal of the motion sensor in relation to the axis Z exhibits all the distinctive properties of the motion signal in relation to the Vertical axis VT (i.e. essentially a power spike at the footstep frequency). The motion signals delivered by the housing BC therefore exhibit distinctive characteristics due to the alignment of the housing BC with the pedestrian frame $R_P$ (ML, AP, VT). Finally the distinctive properties of phase shift between translation motion signals in relation to AP and VT lie on the signals of the motion sensors between Y and Z. For the rotation motions, it would for example be appropriate to utilize a rotation sensor, such as a gyrometer. In a manner similar to the characteristics of translations explained hereinabove, when the frame of the sensor housing is identical to the pedestrian frame, all the distinctive characteristics of the rotation motions of the pedestrian are found on the rotation motion signals (the rotation signals in relation to the axis ML essentially exhibit power at the footstep frequency, in relation to the axis AP, they essentially exhibit power at the stride frequency, as listed hereinabove.

When the orientation of the sensor housing BC is aligned with the Pedestrian frame $R_P$ (therefore the trajectory frame $R_T$), these distinctive properties are therefore necessarily found on each of the measurement axes. It is now possible to describe the fundamental principle of the invention. Indeed, in accordance with the foregoing, when this orientation is arbitrary, that is to say when the transformation operator $Q_{PB}$ is not restricted to the identity as described previously (the orientation of the sensor housing BC is not "identical" to that of the pedestrian or of the trajectory), but unknown, it is therefore deduced therefrom that a good estimator of $Q_{PB}$ should make it possible to find these distinctive properties, on the motion signals arising from the sensor housing BC and transformed by the operator $Q_{PB}$. Indeed, the pedestrian's raw motion signals arising from the sensor housing BC, then exhibit mixtures of the distinctive properties (because they are each combinations of the signals in relation to ML, AP, VT), but their transform by application of the operator $Q_{PB}$ provides the signals in the pedestrian frame $R_P$ (or trajectory frame $R_T$) and these transforms should then again exhibit the distinctive properties identified on the axes of the pedestrian frame $R_P$ (ML, AP, VT). It is thus the object of the invention to utilize these distinctive properties so as to estimate the unknown operators $Q_{PB}$ (or $Q_{RT}$).

The concrete example of the case in which the motion signals are expressed in the housing frame $R_B$ proposes to utilize the distinctive characteristics of a pedestrian's walking motion signals to estimate the unknown rotation operator $Q_{PB}$ for rotating between the housing frame $R_B$ and the pedestrian frame $R_P$. Besides, the same principle applies simply between the pedestrian frame $R_P$ and any frame in which it is possible to express the motion signals. Thus, by knowing the orientation of the sensor housing BC in a reference frame $R_R$ (such as the Terrestrial frame), it is then possible to express the raw motion signals measured by the sensor housing in the reference frame $R_R$ and thereafter to apply the same principle as previously so as to estimate the rotation operator $Q_{RP}$ or $Q_{RT}$ for rotating between the reference frame $R_R$ and the pedestrian frame $R_P$. It is then possible to estimate this unknown operator $Q_{RT}$, just as we have proposed to estimate the unknown operator $Q_{PB}$.

The person skilled in the art knows numerous procedures which can in practice implement the principle of the invention. Indeed, our invention starts from the principle that a good estimator of the unknown orientation (for example $Q_{PB}$) should transform the signals from the frame in which they are expressed (for example housing frame or other reference frame, for example tied to the Earth) in such a way that they again exhibit (all or part) the distinctive characteristics of the pedestrian's motion signals in the pedestrian frame. According to the sophistication of the procedure, the motion sensors available, and the computation power available, it is possible to utilize all or part of the distinctive characteristics of the pedestrian's motion signals. The person skilled in the art can utilize procedures for searching for the parameters of the rotation transformation operator (three independent parameters) for example by a technique of minimization (or maximization) of criteria built on compliance with the distinctive characteristics.

It is indeed possible to build criteria which are representative of the mismatch between the characteristics of the motion signals transformed by a candidate orientation operator and the distinctive characteristics of the motion signals in the pedestrian frame, and to take as better estimator of the unknown orientation the one which generates the best criterion. In the case of a mismatch criterion (the less the characteristics of the signals transformed by the candidate rotation operator comply with the characteristics of the motions in the pedestrian frame, the larger the criterion), the best estimator will be the one which generates the smallest mismatches. Thus, for example, as long as the translation motion signals measured (which are optionally transformed on the basis of the signals arising from the housing in a chosen reference frame) and transformed by the candidate operator and thus potentially representing the signals in relation to the Antero-Posterior axis AP of the pedestrian thus predicted by the candidate operator do not exhibit a power essentially at the footstep frequency, then the mismatch remains large and the candidate operator is not retained. Indeed, the candidate operator is not the appropriate one as long as we do not retrieve this distinctive characteristic of the translation motion signals in relation to the Antero-Posterior axis AP. It is possible to build procedures for searching for the best candidate operator by iteration for example, by proposing successive candidate operators and by retaining that which possesses the best criteria. It is possible to traverse the whole of the space of rotation transformation operators and choose that which provides the best criterion as solution. It is advantageously possible to use more efficacious procedures for searching for a minimum or maximum, such as gradient descents for example. This entails traversing a landscape whose coordinates are the parameters of a rotation transformation operator (i.e. three independent parameters), computing the value of the distinctive characteristics compliance criterion after having transformed the motion signals into the frame of the pedestrian predicted by the candidate operator.

In addition to these automatic search procedures based on criterion optimization, it is also possible to analyze a particular criterion and to propose a direct analytical solution which, in a single computation, provides the best estimator of the unknown rotation operator. It is also possible to provide mixed solutions by combining direct analytical solutions when possible and optimization procedures when a direct expression is not possible.

It is for example possible to design a method for estimating the operator $Q_{PB}$, which exhibits candidate operators (taken from the set of possible rotation transformation operators), the best candidate or candidates which is or are retained as rotation estimator $Q_{PB}$ is or are that or those transforming the motion signals measured in the frame of the housing into signals which exhibit (all or part) of the distinctive characteristics of the motion signals of the pedestrian frame $R_P$ (ML, AP, VT). The best solution (the best candidate operator, the "winner") is then that for which the correspondence between the properties of the signals transformed by this best solution and the distinctive properties of the walking/running signals in the pedestrian frame is the best. It is seen that it is potentially useful to combine several distinctive properties, in such a way as to best estimate the unknown operator, limit the indeterminacy, and provide the most noise-insensitive estimator. We note that certain distinctive characteristics may be more difficult to observe than others. It is then not relevant to retain them in the criterion. Indeed according to the nature and performance of the sensors, the type of walking analyzed, certain distinctive characteristics will be easier or harder to identify on the signals, it is therefore appropriate for the person skilled in the art to choose them from the list, in order to build an effective estimator.

It is therefore apparent that it is not at all obvious, as the prior art would lead one to think, that the direction of the trajectory of the pedestrian is given automatically merely by detecting the direction of a "powerful" translation motion signal. In an illustrative manner, we show that certain signals of significant power occur along the medio-lateral axis ML of the pedestrian, perpendicular to the direction of displacement of the pedestrian. It is possible to refer to FIGS. 12 and 14.

In a mode of implementation of the invention, use is made of these distinctive characteristics of the motions tied to the thorax or to the pelvis of the pedestrian:

the signals of the translation motions performed by the thorax or the pelvis of the pedestrian during a walking activity (generalizable to running) along the Vertical axis VT essentially exhibit power at the footstep period (also known as the "step cadency"), the signals of the translation motions performed by the thorax or the pelvis of the pedestrian during a walking activity (generalizable to running) along the Antero-Posterior axis AP essentially exhibit power at the footstep period (also known as the "step cadency"), and the signals of the translation motions performed by the thorax or the pelvis of the pedestrian during a walking activity (generalizable to running) along the Medio-Lateral axis ML essentially exhibit power at the stride frequency (also known as the "stride cadency"), and the stride frequency is half as large as the frequency of the footsteps and corresponds to the stride frequency.

Moreover, it is also noted that the phase shift between the pedestrian's translation motion signals in relation to the Vertical VT and Antero-Posterior AP axes (both exhibiting one and the same characteristic of power essentially present at the footstep frequency) is close to $\pi/2$. This phase shift is therefore also a distinctive characteristic that we can introduce into the list of distinctive properties and therefore into an estimator or into a computation sequence for the unknown rotation operator.

We note the following very significant element also. It is not necessary for the motion sensors to be placed directly on the chest, thorax or pelvis of the pedestrian. It is only necessary that, by a mechanical means, a sufficient portion (measurable by sensors) of these motion signals be transmitted to the housing. Thus, it will be noted that the translation motions of the chest of a pedestrian are transmitted to a sensor housing carried in the hand by the pedestrian in consultation mode for example. In this mode of carriage, the arm constitutes a mechanical element which transmits the motions of the chest to the hand and these motions can then be measured. The head is also a position wherein these properties are well transmitted. The case of hanging limbs (swinging arm when walking for example), legs constitute exceptions and the distinctive properties of the motions of the pelvis, chest must then be revised.

When the pedestrian undertakes a walking or running activity, the set of characteristics representative of the pedestrian's chest translation motion signals represented in a pedestrian frame $R_P$=(AP, ML, VT) defined by the pedestrian's Antero-Posterior AP, Medio-Lateral ML, and Vertical VT axes comprises:

the signal due to the translation motion in relation to the Medio-Lateral axis ML essentially exhibits power at the stride rate;

the signal due to the translation motion in relation to the Antero-Posterior axis AP essentially exhibits power at the footstep rate;

the signal due to the translation motion in relation to the Vertical axis VT essentially exhibits power at the footstep rate;

the signals due to the translation motions in relation to the Vertical axis VT and along the Antero-Posterior axis AP exhibit a substantially constant phase shift of close to $\pi/2$; and the footstep rate is substantially twice the stride rate.

Moreover, other distinctive characteristics of the motion signals of the chest of the pedestrian P, this time in rotation, can be utilized. Just as the accelerometer constitutes a first simple and potentially low-cost choice for sensing the translation motions of a pedestrian, a gyrometer is then for example a good choice of sensor for rotation motion signals. Low-cost gyrometers make it possible to measure instantaneous rotation speeds and are suitable for sensing the rotation motions of the housing into which they are inserted.

We then have the following complementary list of distinctive properties in the rotation motions of the chest or thorax or pelvis:

the signal due to the rotation motion in relation to the Medio-Lateral axis ML essentially exhibits power at the footstep rate;

the signal due to the rotation motion in relation to the Antero-Posterior axis AP essentially exhibits power at the stride rate; and the signal due to the rotation motion in relation to the Vertical axis VT essentially exhibits power at the stride rate.

Thus, the set of distinctive characteristics of the motion signals of the chest of the pedestrian is bigger than the set of distinctive characteristics of the motion signals of translation alone. It is possible to add thereto a set of characteristics related to the rotation motions. It will be possible therefore to include in the process for computing the unknown orientation operator a combination of the distinctive translation and/or rotation characteristics, so as for example to improve the robustness of the estimator or its sensitivity to noise, to resolve indeterminacies.

We also note that it is also possible to utilize a set of distinctive characteristics of the motions of a pedestrian that would be related to a dangling arm, for example. If the motion sensor is rather sensitive to the swinging motion of the arm, e.g. in the case of the sensor being carried in the hand and the arm being used swinging while walking or running, then it is possible to utilize the characteristics which follow.

When the pedestrian undertakes a walking or running activity, the set of characteristics representative of the pedestrian's arm motion signals represented in a pedestrian frame (RP=(AP, ML, VT)) defined by the pedestrian's antero-posterior AP, medio-lateral ML, and vertical VT axes, comprises:

the signal due to the translation motion in relation to the Antero-Posterior axis AP essentially exhibits power at the stride rate;

the signal due to the translation motion in relation to the vertical axis VT essentially exhibits power at the footstep rate;

the signal due to the translation motion in relation to the axis ML essentially exhibits power at the stride rate;

the signal due to the rotation motion in relation to the medio-lateral axis ML essentially exhibits power at the stride rate; and the rotation signal due to the rotation motion in relation to the vertical axis VT essentially exhibits power at the stride rate, this property being characteristic of a swinging motion of the arm.

Other distinctive characteristics can be added to the previous lists, to take account of the specific features of the motions of other parts of the body of a pedestrian. If the motion sensor is essentially marked by the motions of the chest or of a limb of the pedestrian, according to the nature of the measurement thereof (for example rotation or translation), it is necessary to utilize all or part of the corresponding subset of distinctive characteristics.

The principle of the invention to utilize the existence of distinctive characteristics of the motions of a pedestrian in a walking/running situation has been set forth. It makes it possible to estimate the unknown rotation operator for rotating between the frame in which the motion signals are generated (on the basis of the sensors of a housing carried by the pedestrian) and the frame of the pedestrian $R_P$. The frame of the pedestrian $R_p$ being equivalent to the trajectory frame $R_T$, the rotation operator estimated by the invention therefore links the frame in which the motion signals are generated to the trajectory frame $R_T$. The principle of estimating the unknown operator consists in computing, for a candidate operator, a criterion comparing the characteristics of the motion signals transformed by this candidate operator, and the distinctive characteristics of the motions of the pedestrian in the pedestrian frame $R_P$. For a set of candidate operators, the best estimator will be that which exhibits the best criterion, i.e. which indeed makes it possible to retrieve the distinctive characteristics of the motions of a pedestrian in the pedestrian frame $R_P$. The computation can be conducted analytically and/or by a computer which implements a criterion minimization procedure.

Moreover the set of distinctive characteristics of the motions of a pedestrian can be composed of several elements and that thus, it was possible to introduce more information into our estimator. A larger quantity of information allows better estimation of the unknown rotation operator, with doubtless a higher cost of computation and potentially the need to integrate several types of sensors in the housing.

We also note that several housings distributed at various places on the body of the pedestrian can collaborate and consolidate the pedestrian's trajectory orientation estimator. Indeed, a configuration that can commonly be envisaged is that the pedestrian is provided both with his smartphone and also with an additional accessory connected to the smartphone, such as interactive spectacles and/or an accessory carried or worn on the wrist, one and/or the other being equipped with motion sensors. Thus, the invention can apply to both items of equipment and deliver their estimated orientation of the trajectory of the pedestrian, by the method of the invention. The principle applies to multiple items of equipment. This multiple configuration is per se beneficial, since the information redundancy makes it possible to build a better orientation estimator by fusing the multiple estimations. The fusion procedure can be simple and for example combine the estimated multiples or estimations into an average. It is also possible to weight the estimated multiples for example considering a priori their reliability according to their position on the body. Thus, for an item of equipment of a priori fixed position on the pedestrian, such as spectacles placed on the head or a bracelet placed on the wrist, the estimator will be able to be considered to provide a greater reliability than that of an item of equipment which is a priori liable to change position on the body of the pedestrian, such as a smartphone. The weighting of the various estimators is then fixed a priori. We also note that the weighting may be dynamic, that is to say not fixed over time. Indeed, as is the subject matter of French patent application FR 1353616, filed, but not published, by applying a detector of change of position of the sensor housing on the pedestrian, for example by detecting variations of horizontally of the sensor housing, it is possible to weight the estimation dynamically over time. Indeed, during the transitions, the trajectory orientation estimator is presumed to be less reliable, since the estimator takes a certain time to converge.

We propose here a particular embodiment of interest in numerous cases regularly encountered in practice.

A rotation operator is completely determined by three parameters. In a previous paragraph we cited as determining parameters a rotation axis (therefore a unit vector with two independent parameters) and an angle of rotation about this axis. This is the way rotation transformation operators are represented according to the formalism of Quaternions. According to the equivalent formalism of Euler or Cardan angles, the rotation transformation operator is determined by three angles of rotation. It therefore possesses three degrees of freedom. In all the numerous possible representations of a rotation transformation operator, three independent parameters are necessary to fix the operator. It is then necessary to use a sufficient number of distinctive characteristics to correctly and uniquely determine these three degrees of freedom. The apposite set of distinctive characteristics is not always simple to determine. To simplify this estimation, it is proposed to utilize a horizontal reference frame tied to the Earth, and the signals arising from the sensor housing BC are expressed in this reference frame $R_R$, before estimating the rotation operator $Q_{RT}$. The reference frame then exhibits a vertical axis, and two horizontal axes. As the commonest pedestrian frame is (ML, AP, VT) which also exhibits a vertical axis and two horizontal axes, the unknown operator for transforming between the reference frame and the pedestrian frame is limited to a rotation with vertical axis. The problem is then equivalent to a problem with a single unknown angle, instead of three angles or three parameters in the general case. This mode of implementation is suitable for a large number of regularly encountered situations, such as those of a user of a smartphone, of interactive spectacles or of an accessory carried by the user, equipped with the sensors regularly encountered in this type of apparatus.

By definition of the frame tied to the human body such as defined in FIG. 3, the Vertical axis VT of the pedestrian is directed along the vertical, that is to say along the gravity axis. The Medio-Lateral ML and Antero-Posterior AP axes therefore form a horizontal plane at each instant.

Thus, the problem to be solved in order to determine the unknown orientation between the frame in which the motion signals are expressed and the pedestrian frame $R_p$ is to find the rotation transformation operator $Q_{RT}$ which transforms the signals frame into the pedestrian frame $R_P$. It is readily noted straight away that this transformation operator must already transform the plane of the signals frame into a horizontal plane, since the pedestrian frame possesses a horizontal plane such as this, thereby determining two of the three unknowns of the rotation transformation operator. It is therefore practical to immediately express the motion signals in a horizontal frame, by virtue of a rotation transformation operator provided or estimated with the aid of the motion sensors. The remaining unknown operator is now merely a rotation transformation operator in relation to the vertical axis alone (i.e. an angle of heading) and it will then be possible to estimate it more readily by the principle of the invention. It will thus be possible to limit the distinctive characteristics to be utilized, reduce the uncertainty of the estimator.

In a large number of situations, it is possible, on the basis of the sensors present in the housing BC carried by the pedestrian, to estimate the first operator which transforms the housing frame $R_B$ into a horizontal reference frame and to express therein the motion signals measured by the sensors of the housing BC. Indeed inertial sensors commonly present in smartphones make it possible to compute the orientation of the housing BC in the terrestrial frame $R_R$.

The last unknown is then related to the orientation in terms of heading of the body of the pedestrian. This is precisely one of the applications of the invention, utilizing the distinctive characteristics of the motions of the body, consisting in retrieving the latter unknown angle.

It is therefore advantageous to choose a reference frame tied to the Earth, in which the motion signals measured by the sensors of the housing BC are expressed.

The motion sensors principally considered (such Accelerometers, Gyrometers and Magnetometers) provide three-dimensional measurement vectors. The sensors are rigidly tied to the sensor housing BC. It may therefore be considered that the sensors thus deliver their vector measurements in one and the same frame $R_B$, tied to this housing BC, which is denoted $R_B$. The person skilled in the art is aware of the procedures which make it possible to correct possible misalignments between the axes of the sensors proper and which thus provide the measurements of the sensors in this same, single housing frame $R_B$.

As mentioned previously, techniques are also known for providing the orientation of the housing BC in the reference frame $R_R$ thus determined, fixed with respect to the Earth and exhibiting a horizontal plane and a given heading. It should indeed be noted that the sensors A, G, M, conventionally present in smartphones, make it possible to construct an attitude platform (also known as an "Inertial Measurement Unit") which, for example by a sensors data fusion technique, provides the orientation of the housing frame $R_B$ with respect to a reference frame $R_R$ tied to the Earth, that is to say the rotation transformation operator $Q_{BR}$.

Numerous combinations are possible between the sensors A, G, M in order to arrive at a satisfactory estimation of $Q_{BR}$.

The operator remaining to be estimated is then the operator $Q_{RT}$ which reduces to a rotation operator in relation to the Vertical axis VT. It is determined by a single angle, thereby considerably reducing the dimension of the space of possible solutions. Indeed, even in the case of a poorly optimized search, it will suffice to traverse the space of possible angles, this space being reduced to a single dimension, to form the corresponding rotation operator in relation to Z, compute the mismatch in the distinctive characteristics. The smallest mismatch makes it possible to select the unknown angle. The dimension of the search space is thus reduced from three to one dimension.

We thereafter present in a detailed manner a particular mode of implementation of the invention, which utilizes this particular feature.

The present invention can be applied to any location problem, be it indoors or outdoors. For certain particular cases, for which a location solution would be sought in places in motion with respect to the terrestrial frame, such as a ship, the present invention would still apply, a person skilled in the art would be able to apply a correction angle so as to reorient the map of the place moving in the terrestrial reference frame if need be.

The input of the method is a three-axis motion signal provided by a three-axis accelerometer, a three-axis magnetometer, or a three-axis gyrometer. The invention can be applied to each of these three sensors, or to a combination of these sensors. When a motion signal related to the acceleration of a body is sought, the best sensor to choose is an acceleration sensor. When a motion signal related to the rotation of a body is sought, it is possible to choose a gyrometer or a magnetometer. The method of the invention applies whatever choice is made. In order to better evaluate the unknown angle of rotation, it is possible to envisage using a combination of sensors A, G, M.

On the basis of the signals of the sensor housing BC, the orientation $Q_{BR}$ of the sensor housing BC in the terrestrial reference frame $R_R$ is estimated for example by a method of inertial platform type. The reference frame thus chosen is tied to the Earth. It exhibits a horizontal plane formed by the axes XR and YR, the axis ZR being vertical. The unknown transformation operator $Q_{RT}$ for transforming between such a reference frame $R_R$ and the trajectory frame $R_T$ (that it will be recalled is equivalent to the pedestrian frame $R_p$ and is taken here equal to the pedestrian frame $R_p$) is then restricted a rotation operator in relation to the vertical axis. Known techniques of the prior art make it possible to estimate the orientation of the sensor housing BC in a reference frame $R_R$ on the basis of a combination of inertial sensors, such as accelerometers which easily provide information related to the roll and pitch angles in the terrestrial reference frame, Gyrometers which provide the rotation speeds of the sensor housing, magnetometers which measure the magnetic field of the Earth and make it possible to determine a heading of the sensor housing with respect to the North of the Earth. Depending on the class of sensors used, it will advantageously be possible to implement Gyrometer only solutions, Accelerometer-Gyrometer or Accelerometer-Gyrometer-Magnetometer solutions. We note that the definition of the heading of the reference frame $R_R$ can be chosen according to convenience. The trajectory orientation estimator which is the subject of the invention will then provide the heading of the trajectory with respect to the reference frame. Thus, a reference frame whose heading is known with respect to the conventions of the maps conventionally used for geographical charting will be advantageous. Maps are conventionally charted with respect to geographical North, hence a reference frame having a similar convention will advantageously be used.

In the example of a smartphone, of an accessory, of interactive spectacles, the sensors present make it possible to estimate this housing orientation operator $Q_{BR}$ in the terrestrial reference frame. The software solutions for computing the operator are often also embedded. As is well known to a person skilled in the art, basing oneself solely on an accelerometer provides a noisy estimation for this operator since the accelerometers provide the sum of the gravity signals, which contain the useful signals for estimating the roll and pitch angles, and the inherent acceleration of the sensor housing, because of the trajectory of the sensor assembly, this acceleration component being considered to be noise for the best estimation of the roll and pitch angles. Moreover, the angle of heading of the reference frame may not be determined by a solution based only on the accelerometer.

However, when the motion is periodic, it is possible to reduce the effect of the inherent acceleration by applying a low-pass filter to the data of the accelerometer and thus obtain a better estimation of the roll and pitch angles. Anyway, a solution based solely on an accelerometer does not provide any information about the angle of yaw, which remains unknown. Other procedures combining accelerometers and magnetometers offer the possibility of estimating the angle of yaw, always to the detriment of the sensitivity to the inherent acceleration and therefore requiring a certain cleaning by previously cited filters.

A solution based on a gyrometer is also possible. The person skilled in the art is aware of the methods for computing an orientation on the basis of a gyrometer signal which delivers rotation speeds. This sensor makes it possible, by an integration procedure, to retrieve the orientation traversed from the first instant considered in the integration computation. If the orientation is known at the first instant of integration, then the absolute orientation of the sensor housing is known at each instant. In addition to the necessity to know an absolute orientation at a given instant, this method also exhibits limitations related to the class of the gyrometric sensor. Indeed, a sensor exhibiting defects of bias or of sensitivity may generate significant errors on output from the integration method. For example, the more poorly the bias is known, the faster will be the drift observed. Current sensors of "consumer" class exhibit drifts of the order of a few degrees per minute, thereby limiting the methods based solely on gyrometers with very short scenarios of use. Sensors of better class, which might be anticipated to become available at ever lower cost, exhibit drifts of the order of a few degrees for scenarios of the order of an hour. When a high-performance gyrometer is available, it alone makes it possible, depending on its performance, to compute the operator $Q_{BR}$ at each instant, on the basis of initially giving the orientation of the housing. Performance attitude platforms, independent of magnetic signals, of large accelerations, and fairly drift-free for time periods ranging from several tens of minutes to a few hours are thus available.

The best combination comprises a combination of an accelerometer, magnetometer and gyrometer, which makes it possible to provide the complete orientation of the sensor housing in the terrestrial reference frame. Not only does it provide complete information regarding orientation, but it is insensitive to the inherent acceleration and to the effect of the angular drift of the gyrometer.

Numerous techniques, such as those described in documents FR2934043, or FR2930335, or FR 1154915 can be applied to obtain the operator $Q_{BR}$, and this invention can therefore be applied.

It is now considered that one possesses sufficient information about the rotation operator $Q_{BR}$ linking the sensor housing to the terrestrial reference frame. This operator is completely defined. As described previously, the techniques known to the person skilled in the art are capable of providing this rotation operator $Q_{BR}$. For the sake of clarity, it is considered in this part that the body's motion information is provided by the accelerometer of the sensor housing. As described previously, it is possible to apply the procedure which follows to the gyrometer signals or to the magnetometer signals or to a combination of A, G, M signals. As mentioned hereinabove, and used in this mode, the motion signal can be expressed in a terrestrial reference frame by virtue of the application of the operator $Q_{BR}$ and only an angle of rotation about the vertical axis is unknown and must be determined so as to pass from the reference frame to the pedestrian frame (or trajectory frame since they are equivalent). It is therefore possible to use just a limited subset of motion characteristics of the walking of the pedestrian to provide the unknown angle of heading of the pedestrian in the terrestrial reference frame, which is the unknown that we seek.

In what follows, a mode is presented which counts on only a few characteristics of the translation motions of the chest of the body of a pedestrian undertaking a walking or running activity.

We note in passing that when the pedestrian has stopped, it is no longer possible to estimate his heading insofar as the distinctive characteristics of the motions of the pedestrian are no longer visible. This does not constitute a problem insofar as specifically, the pedestrian is not moving. The heading information is then meaningless.

On the basis of the three-measurement-axis accelerometer signals 3A provided in the sensor housing, and of the knowledge of the rotation transformation operator $Q_{BR}$ which provides the rotation between the frame of the sensor housing $R_B$ and the terrestrial reference frame $R_R$, it is easily possible to compute the motion signals sensed by the accelerometer in the reference frame $R_R$, one of whose axes named $Z_R$ is vertical (i.e. collinear with the gravity), the other axes $X_R$ and $Y_R$ therefore being in the horizontal plane. A natural reference frame is the North, East, Vertical terrestrial frame. The axis $Z_R$ being the vertical axis, the axis $Y_R$ can be considered to be the North direction. The axis $X_R$ is selected to define an orthonormal base (it is then said to be pointing East). We have therefore defined our terrestrial reference frame, the axis $Z_R$ of which is vertical, and the axis $X_R$ may be North, the axis $Y_R$ then being East. We are then able to provide the acceleration signals initially provided in the frame $R_B$ of the sensor housing BC in this terrestrial frame, that is to say we obtain the acceleration AccX along the axis $X_R$, the acceleration AccY along the axis $Y_R$, and the acceleration AccV along the axis $Z_R$ which is equal to the vertical axis VT.

In a preferred embodiment, this intermediate reference frame can be the terrestrial reference frame, defined by a "vertical" axis, a "North" axis and an "East" axis.

The relevant step consists in obtaining motion information (in this instance the acceleration signals) in a frame, one of whose axes is vertical, therefore equal to the axis VT of the pedestrian frame $R_P$. The inventive steps are then envisaged which provide the remaining unknown angle which makes it possible to obtain the remaining rotation operator $Q_{RT}$ for rotating from the reference frame $R_R$ to the pedestrian frame $R_P$. Sensor signals are therefore considered which are provided in the terrestrial frame, one of whose axes is aligned with gravity $Z_R$. Once again, it is considered that the pedestrian frame $R_P$ and the trajectory frame $R_T$ are equal, and therefore that the operators $Q_{RT}$ and $Q_{RP}$ are equal.

A rotation in relation to a single axis linking the pedestrian frame $R_P$ to the reference terrestrial frame $R_R$ is now unknown but we know that it is a rotation about the vertical axis with an unknown angle that we will denote by $\theta$. This angle $\theta$ is the angle of heading of the pedestrian in the terrestrial reference frame. Hence, finding $\theta$ makes it possible to solve the trajectory heading problem, which is an aim of the invention. The aim of the invention is now to provide an estimation of this unknown angle $\theta$, so that the rotation operator relating the terrestrial reference frame and the pedestrian frame is completely defined.

Recall that the method according to the invention is divided into three principal steps and uses the distinctive characteristics of the motion of the human body, as described previously.

We present a complete computation method, also comprising the estimation of the pedestrian's walking rate. This information can be obtained in a different manner to that presented here according to different modes known to the person skilled in the art. The aim of the first step is to determine the footstep rate of the walking. In this first step, we have, as an intermediate step, the delivery of the principal frequency of the walking (that is to say, to be specific, the footstep frequency) of the walking or running activity. A preferred embodiment consists in estimating the footstep frequency using the motion signal in relation to the vertical axis and exhibiting the maximum power. Since here the aim is to estimate the footstep frequency, any other procedure is suitable for the following steps, as long as they provide the footstep frequency. The person skilled in the art is aware of numerous different procedures for computing the footstep frequency.

Computing the footstep frequency on the basis of the vertical axis motion signal is a preferred embodiment. It is possible to estimate the footstep frequency by another method, by using another motion sensor, and/or by using the norm of the acceleration, or with the aid of another detection axis, to perform the estimation of the footstep frequency by using signals in the sensor frame. As seen previously, utilizing the vertical axis is advantageous since, when considering translation motions, one of the significant characteristics listed is that the translation signal in relation to the vertical axis essentially exhibits power at the footstep frequency, this being what we are seeking in this first step.

Since the walking activity provides a footstep frequency generally in a limited passband width, it is possible to improve any method through a high-pass filtering, a low-pass filtering or a bandpass filtering which filters the motion signal in the passband of the footstep frequency. The conventional values for a walking activity are 1.0 Hz to 2.5 Hz. A person skilled in the art knows that there are several techniques for estimating the footstep frequency of a pedestrian on the basis of motion signals. It is for example possible to apply for example the technique of patent FR2942388. Time domain or frequency domain techniques may be applied.

The advantage of a procedure based on the motion signal in relation to the vertical axis that we describe as an example, is that the motion signal exhibits the interesting property of having a maximum energy spike centered around the footstep frequency and, for example, of not being subject to the problem of mixing of the footstep frequency and of the stride frequency, thereby easing the processing to obtain a reliable and accurate estimation of the footstep frequency.

In this first step, once the footstep frequency has been estimated, the second sub-step of the first step is to provide the amplitude, the energy or the power of the motion signals in relation to the axis $X_R$ and the axis $Y_R$ (i.e. the acceleration signals AccX and AccY) for the footstep frequency. It is easily possible to understand that the aim of this power estimation is to be able to match up the distinctive characteristics of the human gait which are that along the Antero-Posterior axis AP of the pedestrian frame $R_P$, the signal of a translation motion exhibits a power spike at the footstep frequency, whereas on the Medio-Lateral axis, it does not exhibit any noticeable spike at this same frequency. For such power estimation, it is possible to use, for example, the output of the Fourier transform of the signals AccX and AccY for the footstep frequency. Other techniques can be applied, in the time domain for example. A person skilled in the art knows how to evaluate the amplitude, the energy or the power of the signals AccX and AccY for the footstep frequency. A narrow filter centered around the footstep rate frequency can be applied to the signals AccX and AccY, and the amplitude of the filtered signal can be computed to provide the result.

In the numerous variants intended to estimate the power of the signal on AccX and AccY at the footstep rate, it is also possible to apply a matched filter to the signals AccX and AccY to estimate the power of the signal at the footstep frequency. This procedure deserves a short description since it is suitable for our case of a pedestrian. For this application, it is possible to choose the temporal signal in relation to AccV (that is to say in relation to the vertical) as impulse response of the matched filter. Indeed, it is known, as is listed in the list of distinctive characteristics of the motion signals of a pedestrian in a walking situation, that the acceleration signal in relation to the vertical component essentially exhibits power at the footstep frequency. It is also known that the signal in relation to the axis AP is essentially marked by power at the footstep frequency, and, interestingly, that this signal is phase-shifted from AccV by a constant value (about $\pi/2$). Consequently, taking the acceleration signal in relation to the vertical direction as impulse response of a matched filter makes it possible, by applying this filter to the signals AccX and AccY, to extract from these two components, the signal which is best correlated with AccV and thus to estimate the power, on AccX and AccY of the signal at the footstep rate.

Once the power of the signal at the footstep frequency has been extracted from AccX and AccY, the second step provides the still unknown angle of rotation between the two-dimensional or 2D frame $(X_R, Y_R)$, $X_R$ and $Y_R$ being the horizontal axes of the reference frame and the Medio-Lateral ML and Antero-Posterior AP axes of the pedestrian frame $R_P$. This step is based on distinctive characteristics of the frequencies of the human walking activity, which is that the motion along the Medio-Lateral axis ML does not exhibit any footstep frequency (but a stride frequency signal), while the motion along the Antero-Posterior axis AP exhibits a footstep frequency signal (and not stride frequency signal). Thus the unknown angle makes it possible to transform AccX and AccY into the acceleration signals in relation to the axes AP and ML. This rotation transformation in relation to the vertical of angle θ must therefore be such that, after transformation, the entire power of acceleration signals at the walking rate lies solely along the axis AP.

We could apply the same logic as in steps 1 and 2 while focusing on the stride frequency. We would then firstly seek, on the basis of an estimate of the stride rate (or stride frequency) the power of the signals in relation to AccX and AccY at this frequency. This frequency could simply be deduced from the footstep frequency by dividing the latter by a factor of 2, since the stride frequency is half the footstep frequency. We could then seek the power of the signal at the stride frequency thus determined for example by a frequency transform technique. Next, on the basis of the power values of the signals AccX and AccY, retrieve the angle which transforms AccX and AccY into AP and ML, by seeking this time that the power spike of the signal after transformation lies essentially along the axis ML obtained with the candidate angle, insofar as it is known that the power of the acceleration signal at the stride frequency lies essentially along the axis ML of a pedestrian.

As noted, this second step provides the unknown rotation heading angle modulo $\pi$. We therefore obtain the direction of the axis AP, or direction of walking of the pedestrian. On completion of the second step, we cannot yet find the sense of the Antero-Posterior axis AP, which is positive or negative, implying that we do not know the sense in which the pedestrian is moving. Therefore, it is not possible to determine whether the pedestrian is going in one direction or the opposite direction, thus leaving two possible solutions. With this lone distinctive characteristic of the walking motion, we always have a heading solution which is under-determined to within $\pi$.

With this lone distinctive characteristic of the human walking motion, we always have an under-determined solution.

The third step provides the selection of the sense and removes the indeterminacy of the modulo $\pi$, of the passage from the frame (ML, AP) to the frame $(X_R, Y_R)$ on the basis of the analysis of the distinctive characteristic of phase shift between the signals of the accelerometer along the Antero-Posterior AP and vertical VT axes which is $\pi/2$.

Figure 6:
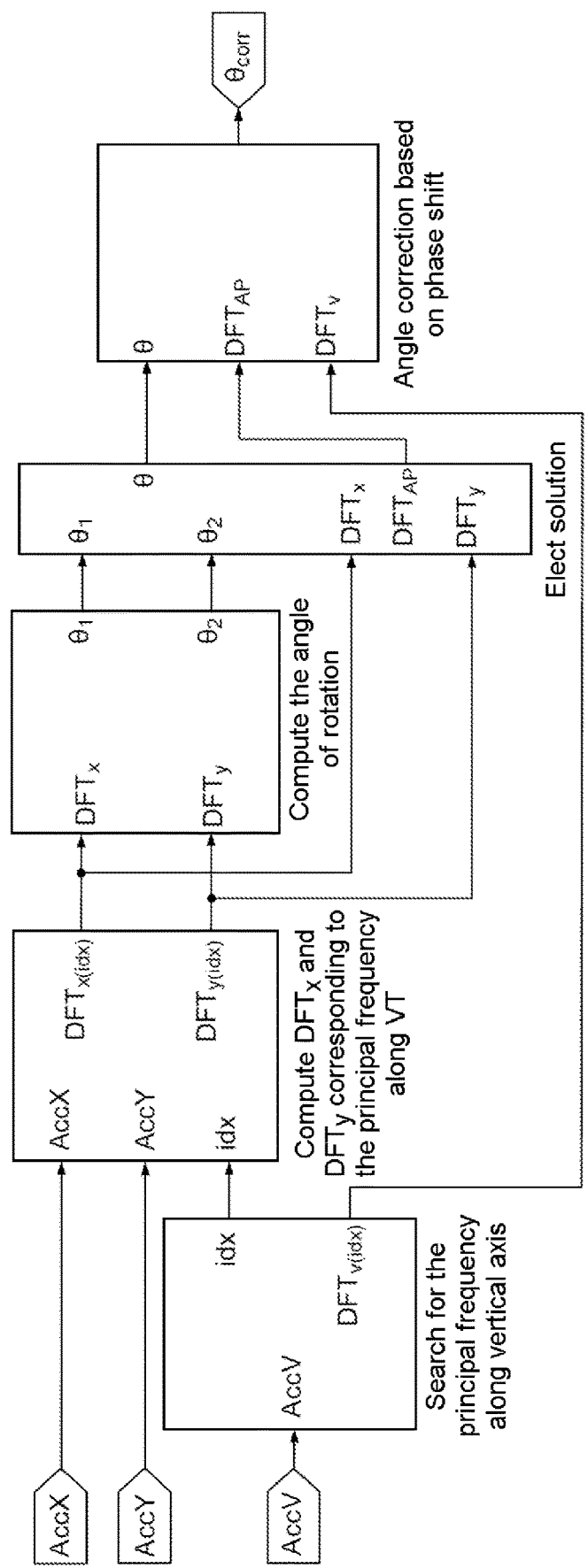
FIG. 6 schematically illustrates an embodiment of the invention.

The overall block diagram of an embodiment of the invention is represented in FIG. 6.

It is pointed out that it is easily possible to modify the solution presented here in detail so as to exploit the other distinctive characteristics of human walking, such as the presence of a power spike on the Medio-Lateral axis ML at the stride frequency and no power spike at the stride frequency on the Antero-Posterior axis AP. This is a direct extension of the detailed solution presented here. It is also possible to use the same characteristics, in a different order or according to procedures equivalent to that described.

FIG. 6 presents in block diagram mode a method of computation which implements an embodiment of the invention. (AccX, AccY, AccV) are the 3D motion signals delivered in the reference frame $(X_R, Y_R, Z_R)$, $Z_R$ being vertical, and $(X_R, Y_R)$ forming a horizontal plane. The reference frame can be a terrestrial frame. The first step of this embodiment (i) computes the footstep frequency (indicated by the index idx) of the walking activity on the basis of AccV. This first step also delivers the magnitude of the vertical motion AccV around the footstep rate, i.e. DFTv (idx) (here specifically this is a complex number with a modulus and a phase). In this embodiment, a Fourier transform is used, the footstep frequency is estimated on the basis of the signal AccV in the frequency domain. Next, we compute (ii) the magnitude of the signals AccX and AccY around the footstep frequency given by the index idx. In this embodiment these magnitudes DFTx(idx), DFTy(idx) are computed by a Fourier transform around the footstep frequency given by the index idx. In a second step of this embodiment, we utilize the distinctive characteristic of the motion signals in relation to the axes AP and ML (the first, AP, exhibits a predominant power around the footstep frequency, the second a predominant power at the stride frequency). In this second step, the values DFTx and DFTy are utilized so as to compute the unknown angle of rotation between the vertical axis which transforms the reference frame into the frame of the pedestrian. On completion of this step the unknown angle is determined to within modulus Pi. The direction of the axis of the trajectory is available, but not the sense. The third step takes into consideration the distinctive property which says that the signals in relation to AP and VT exhibit a constant known phase shift (close to $\pi/2$). This third step therefore makes it possible to determine the unique angle and solves the indeterminacy to within Pi. This step thus ultimately provides the sought-after angle which determines the transformation between the reference frame and the pedestrian frame, thereby determining the pedestrian's heading in the reference frame.

In the subsequent description, we present details of implementation of the solution presented above, according to the block diagram of the processing presented in FIG. 6.

Herein follows the detailed description of the first step (frequency analysis).

As presented above, we concentrate on the characteristic of the translation signals (measured here with an accelerometer) which essentially exhibit, along the Vertical VT and Antero-Posterior AP axes, power at the footstep frequency, whereas this frequency is absent along the Medio-Lateral axis ML. A detailed mode of obtaining the footstep frequency on the basis of the acceleration signal in relation to the Vertical axis VT is presented, and the computation of the power of the signal in relation to the horizontal axes AccX and AccY is presented.

The principal frequency of the motion signals in relation to the Vertical axes VT ($R_z$) is firstly computed. To compute this frequency, it is possible to compute the DFT (discrete Fourier transform) on the motion signals in relation to the Vertical axis VT in the frequency span corresponding to the span of walking frequencies (for example 1 Hz-2.5 Hz). An index corresponding to the power frequency (or frequency of maximum amplitude) is obtained. Thereafter, for this index, the DFT of the acceleration signals AccX and AccY is computed, these representing the amplitude at the walking frequency (here the footstep frequency). To compute these discrete Fourier transforms or DFTs, it is firstly necessary to choose the size of the time window and of the signals sampling frequency. The person skilled in the art knows how to select the size of the time window, the signals sampling frequency, the precise computational mode. However, by way of example, we present an applied method, and this will allow the person skilled in the art to apply variants with a solid basis of comparison.

Accordingly, the maximum frequency considered is 2.5 Hz, and Shannon's theorem gives a minimum sampling frequency of 5 Hz. In practice, we choose a sampling frequency greater than this frequency, for example a sampling period of 20 Hz.

$$F_e = 20 \text{ Hz} \tag{1}$$

The minimum frequency that it is desired to distinguish is half the minimum footstep frequency (0.5 Hz), corresponding to the minimum frequency of the acceleration signal in relation to the Medio-Lateral axis ML. Thus, the time window used for the analysis of the frequency must contain at least one signal period of this minimum frequency.

$$\text{Window} = 2s \tag{2}$$

The Fourier transform computations are implemented so as to extract firstly the value of the footstep frequency on the basis of the acceleration signal in relation to the vertical axis, and then secondly, the power (or amplitude) of the acceleration signals in relation to the horizontal axes for this footstep frequency. We note that the proposed procedure is one of the numerous possible procedures. The illustration implementing a Fourier transform is particularly simple to understand, since it is an operator known to the person skilled in the art. Other techniques, for example based on an AutoRegressive model (AR) of the signal, or on matched filtering, make it possible to achieve the same ends. The objective is to extract the two powers of the horizontal acceleration signals at the footstep frequency, so as thereafter to apply the distinctive characteristic of the translation motions of the chest, thorax, or pelvis of a pedestrian, along the Antero-Posterior AP and Medio-Lateral ML axes. The Fourier transforms or DFTs do not need to be computed for all the frequencies, thereby considerably lightening the computations.

A procedure is presented here which makes it possible to compute in a recursive manner a particular element of the DFT, which is given by the following formula:

$$DFT_j = \sum_{k=0}^{n-1} x_k e^{-\frac{2\pi i}{n} jk} \tag{3}$$

in which:

$x_k$ represents the samples of the signal to be analyzed;

n represents the number of samples in a time window (in this instance 40); and j represents a discrete frequency index defined by:

$$F_j = F_e \frac{j}{n} \tag{4}$$

The direct computation of a DFT element requires n−1 complex products and n complex additions. Furthermore, the DFT is computed over a sliding window, by proposing the recursive DFT computation:

$$DFT_j(t+1) = (DFT_j(t) - x(t-n-1))e^{-\frac{2\pi i}{n}j(n-1)} + x(t)e^{-\frac{2\pi i}{n}j} \tag{5}$$

This recursive version of the DFT requires two complex products and of two complex sums. This is more optimized than the FFT algorithm when the computation is done on a sliding window and for a small number of frequency indices. On the Vertical axis VT, it is necessary to compute DFTj for j varying from 2 to 5, corresponding to the frequency interval from 1 Hz to 2.5 Hz (equation (4)). Thereafter, the maximum of these 4 DFT values is found so as to get the index jw corresponding to the walking frequency.

For the axes X and Y, it is only necessary to compute $DFT_{j_W}$. Two ways of computing this DFT are proposed:

1. Recursively compute DFTj for j=2, . . . , 5 by means of equation (5) and then select the value corresponding to jw.

2. Recursively compute $DFTj_W$ by means of equation (5) each when $j_w(t+1)=j_w(t)$ or compute $DFTj_W$ by means of equation (3) when $j_w(t+1) \neq j_w(t)$.

The choice of procedure depends on the variation of $j_w$, if $j_w$ varies a lot (more than once a second), it is necessary to choose the first computation procedure, otherwise the second. In this instance, the second is chosen.

In a preferred embodiment of the second step of computing the unknown angle of rotation, we use the fact that once we have computed the powers or amplitudes of the acceleration signals AccX and AccY in relation to the two horizontal axes, at the footstep frequency, i.e. DFTx(idx) and DFTy(idx), it is necessary to apply the principle of the invention so as to retrieve the angle by which it is necessary to effect a rotation of the frame with axes $X_R, Y_R$ in such a way as to retrieve the pedestrian frame, defined by the axes ML and AP, in which the distinctive characteristic is expressed.

Figure 7:
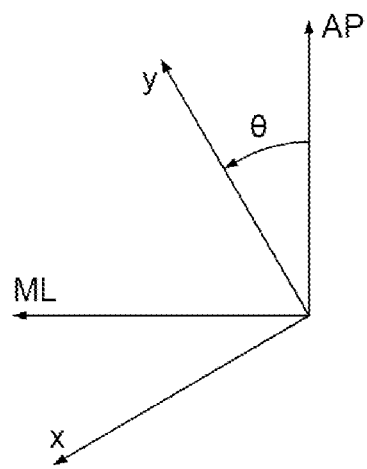
FIG. 7 schematically illustrates an unknown angle of rotation, between the 2D frame formed of the axes $X_R$ and $Y_R$ and the frame formed of the axes ML and AP.

To express the unknown angle of rotation, the following step of the method consists in computing the angle of rotation between the 2D frame formed of the axes $X_R$ and $Y_R$ and the frame formed of the axes ML and AP. These two frames are represented in FIG. 7.

Equation (6) provides the rotation transformation in relation to the vertical axis of the amplitude values of the acceleration signals on the basis of the reference frame in which the estimation of the amplitude in the pedestrian frame is obtained. It may be said that the rotation matrix thus formed with the angle θ represents the candidate operator. If the candidate operator is appropriate then:

$$\begin{pmatrix} DFT_{ML} \\ DFT_{AP} \end{pmatrix} = \begin{bmatrix} \cos(\theta) & -\sin(\theta) \\ \sin(\theta) & \cos(\theta) \end{bmatrix} \begin{pmatrix} DFTx \\ DFTy \end{pmatrix} \quad (6)$$

Indeed, to apply the distinctive characteristic due to the walking motion of the pedestrian, it is necessary to retrieve, through the transformation (6) applied to the doublet (DFTx (idx), DFTy(idx)), also denoted $(DFTx_{jw}, DFTy_{jw})$ with $j_w$ corresponding to the footstep frequency, that $DFT_{AP}$ is a maximum, whereas $DFT_{ML}$ is a minimum. In the example detailed, it is proposed to search for the angle of rotation which maximizes the value of $DFT_{AP}$. It is shown thereafter that the search for this angle is possible with direct equations, hence, it is not necessary to deploy iterative procedures to search for the angle.

Hence, we search for the rotation which maximizes the modulus of $DFT_{AP_{jw}}$ this being equivalent to solving the following optimization problem:

$$\max_\theta F(\theta) = \max_\theta \| DFTx_{jw} \sin(\theta) + DFTy_{jw} \cos(\theta) \|^2 \quad (7)$$

It is possible to find an analytical solution to equation (7). Other procedures are nonetheless possible. We present a mode of computation.

The following notation may be taken:

$$DFTx_{jw} = a_1 + ib_1, DFTy_{jw} = a_2 + ib_2 \quad (8)$$

We insert equation (8) into equation (7), and obtain:

$$F(\theta) = (a_1 \sin(\theta) + a_2 \cos(\theta))^2 + (b_1 \sin(\theta) + b_2 \cos(\theta))^2 \quad (9)$$

Solving equation (7) is equivalent to finding the solution of the following equation:

$$F'(\theta) = A \cos(\theta)\sin(\theta) + B(\cos^2(\theta) - \sin^2(\theta)) = 0 \quad (10)$$

in which:

$$A = a_1^2 - a_2^2 + b_1^2 - b_2^2, B = a_1 a_2 + b_1 b_2 \quad (11)$$

Equation (10) is equivalent to:

$$\frac{2B}{A} \tan^2(\theta) + 2\tan(\theta) - \frac{2B}{A} = 0 \quad (12)$$

This equation has two solutions for $\tan(\theta)$, defined in equation (13), corresponding to the minimum and maximum of equation (9):

$$S_1 = -\frac{A}{2B}\left(1 + \sqrt{1 + \frac{4B^2}{A^2}}\right),$$

$$S_2 = -\frac{A}{2B}\left(1 - \sqrt{1 + \frac{4B^2}{A^2}}\right) \quad (13)$$

Hence, the two possible solutions of equation (7) are:

$$\theta_1 = a\tan(S_1), \text{ or } \theta_2 = a\tan(S_2) \quad (14)$$

To find the appropriate solution, we evaluate $DFT_{AP_{jw}}$ for the two solutions and find that which maximizes $DFT_{AP_{jw}}$.

In addition to the walking heading, it is possible to compute a value of "confidence" of the heading computation thus determined. Indeed, to compute the heading, we maximize the power at the footstep frequency in relation to the axis AP. It is also possible to compute the residual power in relation to the axis ML. If the difference between these two values is large, i.e. greater than a threshold, we have confidence in the computed heading.

$$WH_{confidence} = \left(\frac{(|DFT_{AP}| - |DFT_{ML}|)}{|DFT_{AP}|}\right) \quad (15)$$

Thus, we build a value lying between 0 and 1 which tends to 1 if the entire power indeed lies on the axis AP and which tends to 0 if the powers are distributed between the axis AP and the axis ML.

Figure 8:
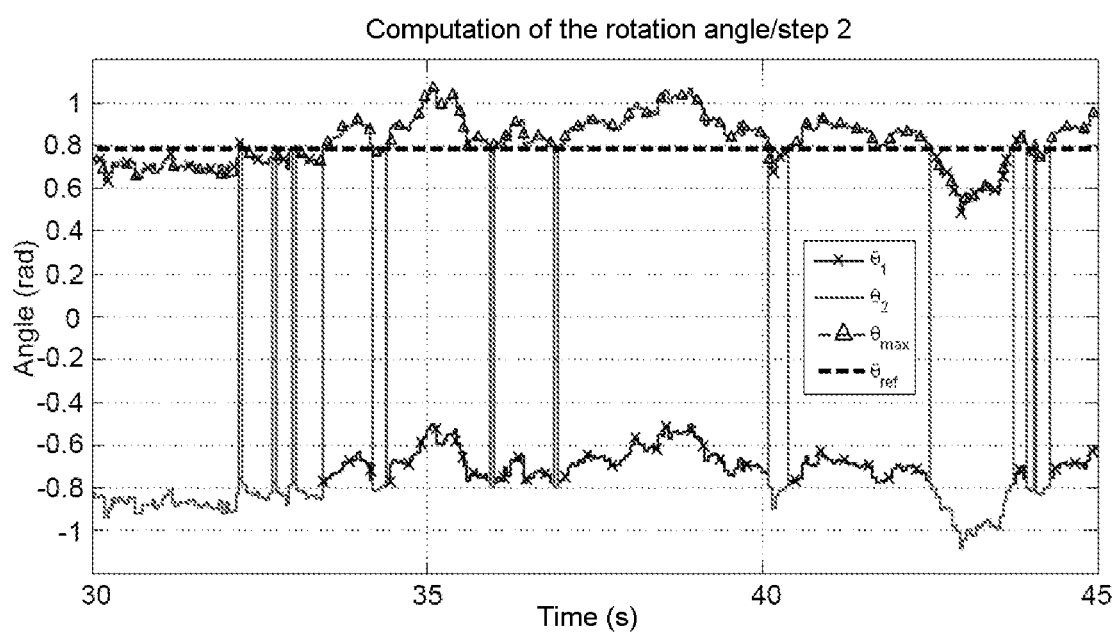
FIG. 8 represents the temporal signals of the unknown angle, according to step 2, according to an aspect of the invention.

FIG. 8 presents the temporal signals of the unknown angle as is determined by a mode of implementation of the invention, such as they arise from step 2. The value of the unknown angle is represented by θ. The truth, estimated or provided by some other means, is represented by $\theta_{ref}$. Two intermediate values of the computation of the unknown angle are presented by $\theta_1$ and $\theta_2$. These two angles are solutions which cancel the derivative of the criterion which has to be maximized. The solution which maximizes the criterion and which therefore arises from step 2 is represented by $\theta_{max}$ On completion of this step, the angle is determined to within modulo π. FIG. 8 presents the results of the computation of the angle of rotation, and illustrates the two solutions $\theta_1$ and $\theta_2$, $\theta_{max}$, and $\theta_{ref}$ the real angle. It may be seen that the chosen solution is the appropriate one and is close to the real angle. On completion of this step, the angle of heading is determined to within modulo π. We know the direction of walking of the pedestrian, that is to say the axis along which he is moving, but it is not possible to give the sense of his walking in this direction.

In a preferred embodiment of the third step, this indeterminacy is removed. On completion of the precedence step, which uses the distinctive characteristic of the translation motions of the chest at the footstep frequency, the angle of heading is estimated to within modulo π. An indeterminacy therefore remains with regard to the sense of the pedestrian frame $R_P$ with respect to the reference frame $R_R$ (i.e. between walking forwards and walking backwards). To remove this indeterminacy, it is possible to introduce an additional characteristic, relating the phase mismatch (or delay) between the acceleration signals in relation to the vertical axis VT and in relation to the Antero-Posterior axis AP. According to this distinctive characteristic, due to the motion of a pedestrian in a walking or running situation, the phase shift must be close to $\pi/2$.

The final heading angle is equal to the angle computed in the previous step e to within modulo $\pi$. To remove this uncertainty, we compute the phase shift $\phi$ between the DFT of the axis VT and of the axis AP.

$$\phi = \text{angle}(DFT_{AP_{fw}}) - \text{angle}(DFT_{V_{fw}}) \quad (16)$$

If the computed phase shift is close to $\pi/2$, we do not apply the correction to the angle, if it is close to $3\pi/2$, a correction of $\pi$ is applied to the angle. In practice, we compare $\phi$ with $\pi$ in order to take a decision.

Figure 9:
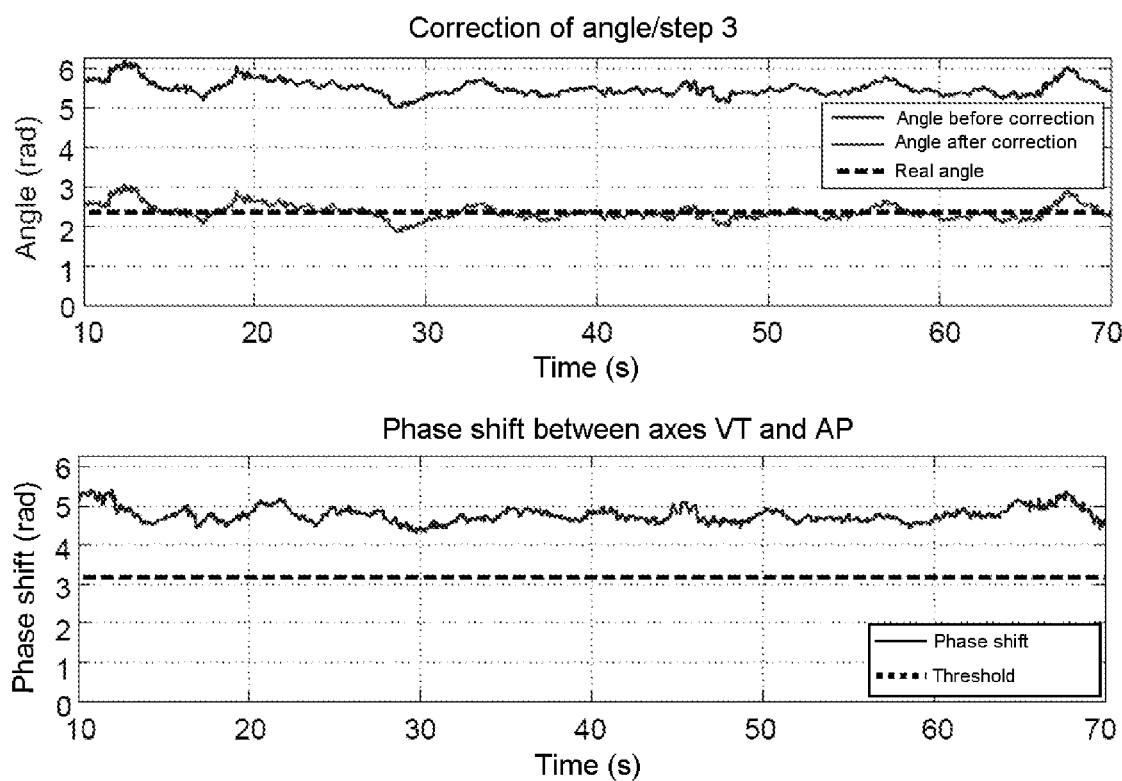
FIG. 9, represents the temporal signals of the unknown angle, according to step 3, according to an aspect of the invention.
Figure 10:
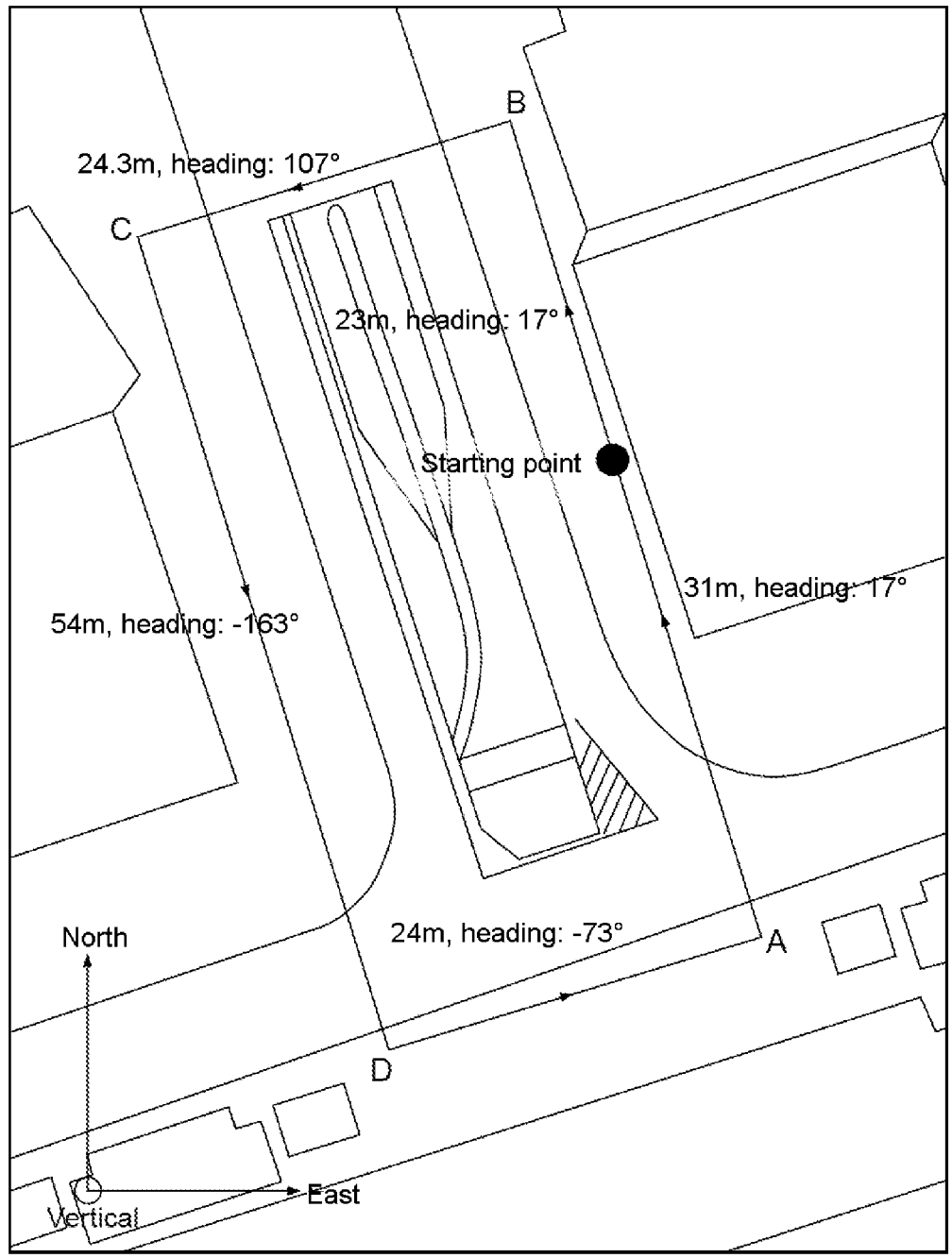
FIG. 10 illustrates a rectangular shaped course, according to an aspect of the invention.

FIG. 9 presents the temporal signals of the unknown angle as are determined by a mode of implementation of the invention, such as they arise from step 3. This step makes it possible to remove the indeterminacy of modulo Pi existing after step 2. The distinctive property utilized is the angle of phase shift between the motion signal in relation to AP and VT. This phase shift is theoretically close to Pi/2. FIG. 10 shows an angle such as arises from step 2 (before correction) which exhibits a mismatch of Pi with respect to the real angle. The phase criterion compares the phase shift between the axes VT and AP. If this phase shift is larger than a threshold (here fixed at Pi) then a correction of Pi is made on the angle before correction.

In the examples which follow, the position of the sensor considered in the experiments, we present the results for which the orientation of the sensor housing tied to the position of the trajectory is known:
hand, in consultation mode,
portrait orientation, for which the orientation of the sensor is approximately equal to the heading of the trajectory,
landscape orientation, for which the orientation of the sensor has a constant mismatch of 90° with the heading of the trajectory.

The trajectory used for the experimentation is a rectangular path as represented in FIG. 10 which presents a rectangular shaped course, with 4 respective segments AB, BC, CD, DA of heading 17°, 107°, −163°, −73°. The starting point belongs to the segment AB and is demarcated by a solid dot.

For the first test, the user is walking with his smartphone in the portrait orientation. Hence, the user is walking in the direction of the heading of the trajectory.

Figure 11:
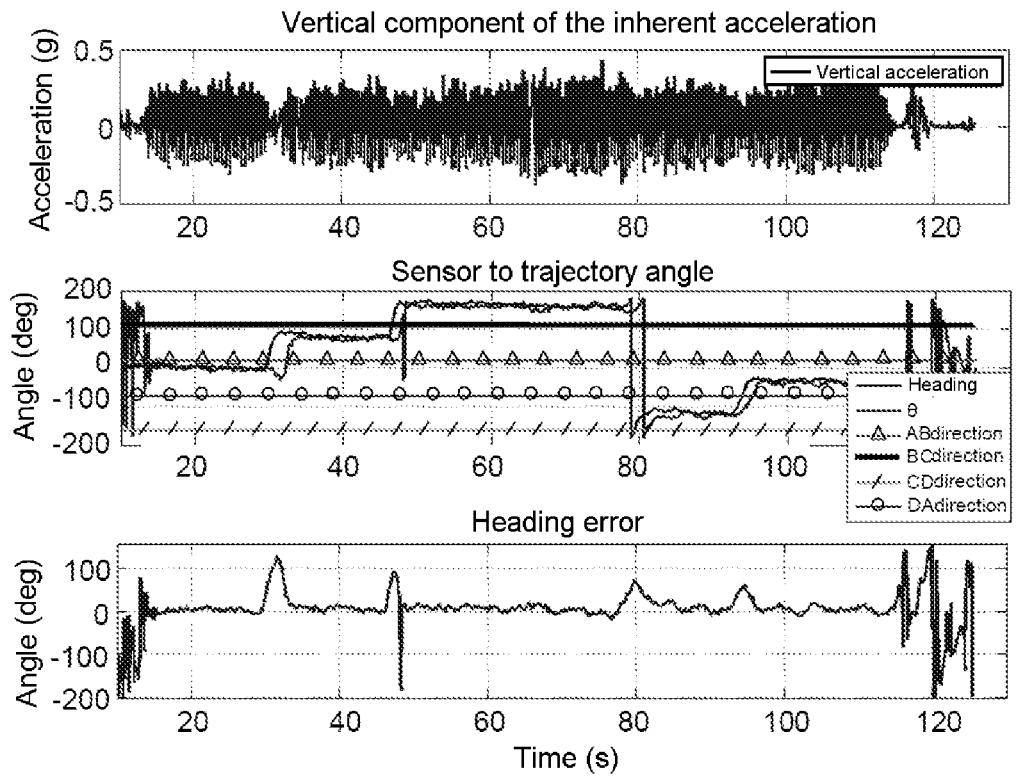
FIG. 11 illustrates an example of temporal signals for a course of FIG. 10.

As illustrated in FIG. 11, the heading of the pedestrian computed by virtue of the method of the invention and the real heading are very close. The lag is about a second, this corresponding to half the sliding window used for the computation of the discrete Fourier transform. As long as the user is in walking mode, the result is appropriate.

Stated otherwise, FIG. 11 presents various temporal signals illustrating the result such as it arises from a particular mode of the invention, applied to the course represented in FIG. 11. The first graph shows the vertical acceleration component. The second graph shows (i) the trajectory angle $\theta$ such as estimated by a particular mode of the invention (ii) as well as the angle of heading of the sensor housing, denoted Heading. In this example, the sensor housing is carried in such a way that the angle of heading of the sensor housing coincides with the heading of the trajectory. This value is therefore the angle value with which the angle of trajectory estimated by the invention must be compared. The 3rd graph presents the mismatch between the angle Heading and the angle $\theta$.

Figure 12:
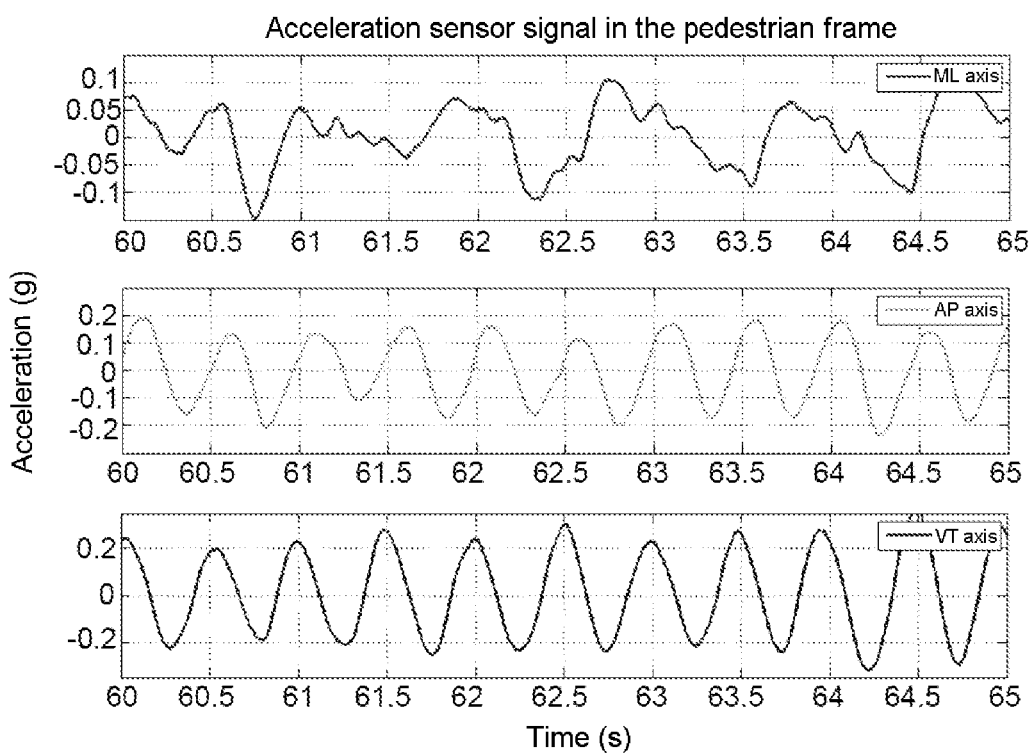
FIG. 12 illustrates a few periods, estimated in the pedestrian frame, of the acceleration signal according to an aspect of the invention.

FIG. 12 presents for illustration a few acceleration signal periods estimated in the pedestrian frame. We thus note experimentally the resilience of the distinctive characteristics of the translation motions of a pedestrian, notably the acceleration signal in relation to the axis ML essentially exhibits power at the stride frequency, the acceleration signal in relation to the axis AP essentially exhibits power at the footstep frequency, the acceleration signal in relation to the axis VT essentially exhibits power at the footstep frequency and exhibits a constant phase shift of about $\pi/2$ with respect to the signal in relation to AP.

FIG. 12 shows the decomposition of the acceleration signals in the frame of the human body. The frequencies in relation to the axes VT and AP are identical and two times smaller in relation to the axis ML.

Figure 13:
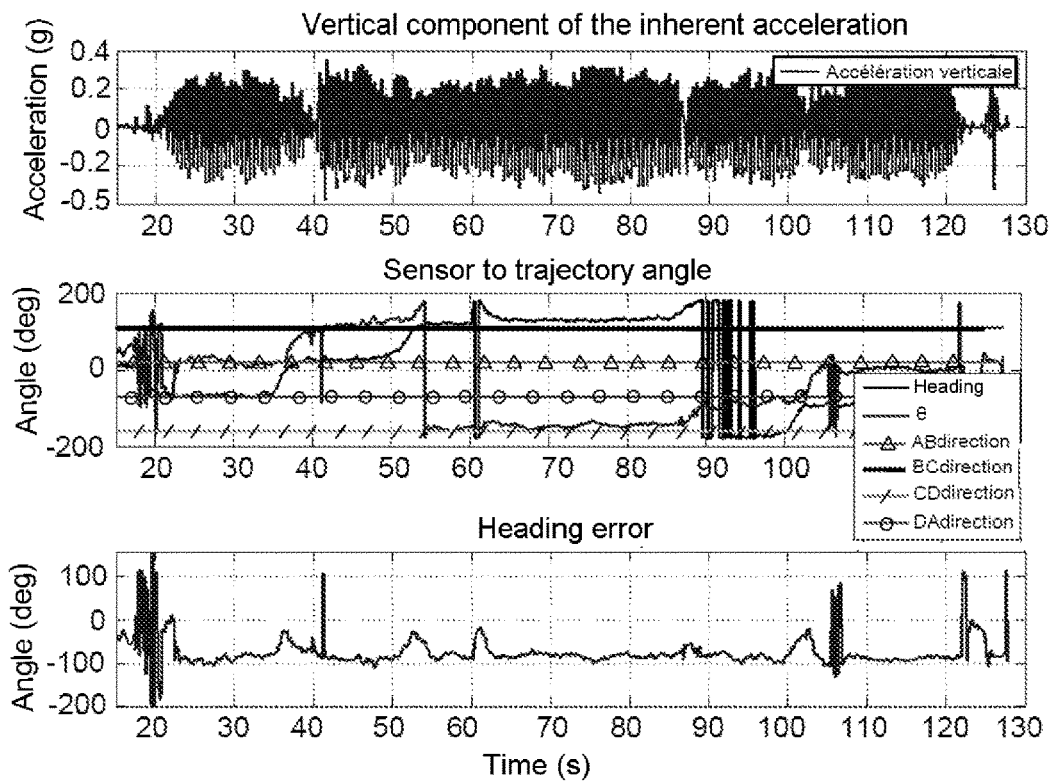
FIG. 13 illustrates a result according to the same formalism as that of FIG. 11, with a realization of the course in which the sensor is held in "landscape" mode.
Figure 14:
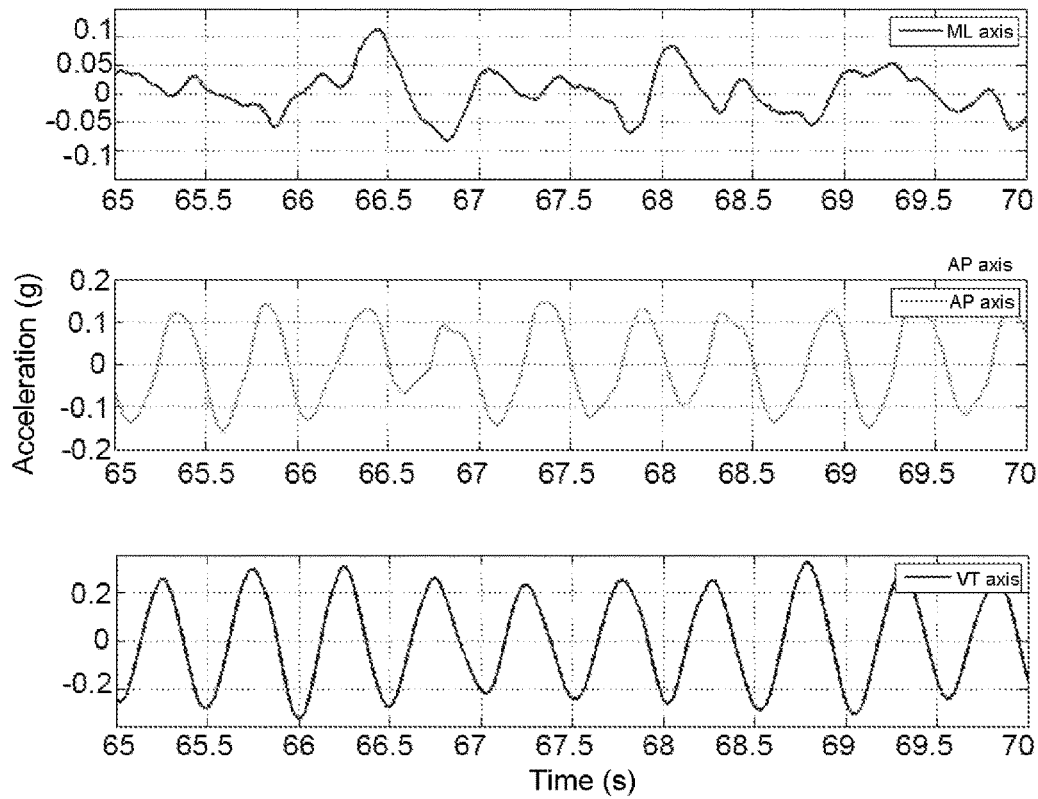
FIG. 14 represents, according to the same formalism as that of FIG. 12, a few periods of the acceleration signal in the pedestrian frame.

In the following test, the user holds his smartphone in the landscape orientation. The smartphone is pointing toward the right. Thus, the shift between the smartphone trajectory and the heading of the trajectory provided by the invention must be 90 degrees, this being correct, as illustrated in FIGS. 13 and 14. A result is presented according to the same formalism as FIG. 11, this time for a realization of the course where the sensor is held in "landscape" mode. The Heading angle then no longer coincides with the Heading of the trajectory but deviates by about $\pi/2$. The angle $\theta$ such as estimated by the invention correctly estimates the heading of the trajectory. FIG. 14 presents, according to the same formalism as FIG. 12, a few periods of the acceleration signal in the pedestrian frame.

The steps of the method described hereinabove can be carried out by one or more programmable processors executing a computer program to carry out the functions of the invention by acting on input data and by generating output data, in the device according to the invention.

A computer program can be written in any programming language, such as compiled or interpreted languages, and the computer program can be deployed in any form, including in the guise of autonomous program or as a subprogram or function, or any other form appropriate for use in a computing environment.

A computer program can be deployed to be executed on a computer or on several computers on a single site or on several distributed sites linked together by a communication network.

The invention claimed is:

1. A method for determining an orientation of a trajectory being traversed by a pedestrian with respect to a reference frame, said pedestrian being furnished with a sensor housing comprising a sensor assembly comprising at least one motion sensor including at least one accelerometer, comprising the steps of:

generating data representative of motion of the sensor housing using said sensor assembly in the reference frame, said motion of the sensor housing caused by the pedestrian traversing the trajectory, wherein the sensor housing is not permanently fixed to said pedestrian, thereby having an orientation with respect to said pedestrian that is initially unknown and can change during use, determining at least one of a footstep frequency and a stride frequency using an acceleration signal from the at least one accelerometer in relation to a vertical axis in a pedestrian frame defined by the pedestrian's antero-posterior, medio-lateral, and vertical axes, said pedestrian frame being tied to a trajectory frame of said trajectory, computing a first rotation transformation operator representative of the orientation of the reference frame with respect to the trajectory frame, compensating for the initially unknown orientation of the sensor housing with respect to said pedestrian, that transforms the generated data representative of the motion to cause exhibition of a medio-lateral motion characteristic, wherein the medio-lateral motion characteristic is one characteristic of a set of characteristics which are representative of signals of walking or running motion of a pedestrian and are expressed in the trajectory frame and exhibition of an antero-posterior motion characteristic, wherein the antero-posterior motion characteristic is another characteristic of a set of characteristics which are representative of signals of walking or running motion of a pedestrian and are expressed in the trajectory frame, wherein the first rotation transformation operator is computed by at least one of: i) maximizing the antereo-posterior motion characteristic and minimizing the medio-lateral characteristic at the footstep frequency; and ii) minimizing the antereo-posterior motion characteristic and maximizing the medio-lateral motion characteristic at the stride frequency, and determining the orientation of the trajectory traversed by the pedestrian using the computed first rotation transformation operator.

2. The method as claimed in claim 1, in which the reference frame is a terrestrial frame, and said generation of the data representative of the motion of the sensor housing is obtained using said sensor assembly in the reference frame by applying a second rotation transformation operator, so as to determine the orientation of the trajectory frame in said terrestrial frame.

3. The method as claimed in claim 2, in which the reference frame and the trajectory frame comprise a common axis, so that the first rotation transformation operator reduces to a rotation transformation operator in relation to the common axis.

4. The method as claimed in claim 3, in which the common axis is oriented along the direction of terrestrial gravity, in such a way that the first rotation transformation operator is reduced to a rotation transformation operator in relation to a direction axis of terrestrial gravity.

5. The method as claimed in claim 2, in which the orientation of the sensor housing in the trajectory frame is determined by composition of the second operator with the first operator.

6. The method as claimed in claim 2, in which an attitude platform function is carried out, providing a value of the second operator of the sensor housing in the reference frame.

7. The method as claimed in claim 6, in which the attitude platform function computes the second operator using a combination of data provided by at least two of accelerometric, gyrometric and magnetic inertial motion sensors present in said sensor housing.

8. The method as claimed in claim 1, in which said set of characteristics representative of motion signals of a chest, thorax or pelvis of the pedestrian comprises the following characteristics:

a signal due to a translation motion in relation to the medio-lateral axis exhibits power at the stride rate;

a signal due to a translation motion in relation to the antero-posterior axis exhibits power at the footstep rate;

a signal due to a translation motion in relation to the vertical axis exhibits power at the footstep rate;

signals due to translation motions in relation to the vertical axis and in relation to the antero-posterior axis, at the footstep frequency, exhibit a substantially constant phase shift; the footstep rate is substantially twice the stride rate;

a signal due to a rotation motion in relation to the medio-lateral axis exhibits power at the footstep rate;

a signal due to a rotation motion in relation to the antero-posterior axis exhibits power at the stride rate; and a signal due to a rotation motion in relation to the vertical axis exhibits power at the stride rate.

9. The method as claimed in claim 1, in which said set of characteristics representative of motion signals of a free limb of the pedestrian comprises the following characteristics:

a signal due to a translation motion in relation to the antero-posterior axis exhibits power at the stride rate;

a signal due to a translation motion in relation to the vertical axis exhibits power at the footstep rate;

a signal due to a rotation motion in relation to the medio-lateral axis exhibits power at the stride rate; and a rotation signal due to a rotation motion in relation to the vertical axis exhibits power at the stride rate.

10. The method as claimed in claim 8, in which said data representative of the motion of the sensor housing in the reference frame are generated using the at least one accelerometer, wherein the at least one accelerometer comprises at least 2 measurement axes, and for which at least one characteristic from among said characteristic or said characteristics is that an acceleration signal due to walking/running along a principal direction of the trajectory or along the antero-posterior axis exhibits a power spike at the footstep rate.

11. The method as claimed in claim 10, in which the rotation transformation operator in relation to the vertical axis is furthermore determined so that a phase shift between the acceleration due to walking/running measured along the vertical axis and an acceleration due to walking/running at the footstep frequency and transformed by said operator along an axis AP lies between 0 and $\pi$, and equals $\pi/2$.

12. The method as claimed in claim 10, according to which the rotation transformation operator in relation to the vertical axis is determined using amplitudes, at the footstep frequency, of two horizontal components of the acceleration signal in the reference frame.

13. The method as claimed in claim 12, in which the amplitude of the acceleration signal at the frequency of the footsteps is determined by matched filtering of the acceleration signal in the reference frame, according to the filter of the vertical acceleration signal.

14. The method as claimed in claim 8, in which said data representative of the motion of the sensor housing in the reference frame are generated using the at least one accelerometer, wherein the at least one accelerometer comprises at least 2 measurement axes, and for which at least one characteristic from among said characteristic or said characteristics is that an acceleration signal due to walking/running along a perpendicular and horizontal direction to a principal direction of the trajectory or along the medio-lateral axis exhibits a power spike at the stride rate.

15. The method as claimed in claim 14, in which the rotation transformation operator in relation to the vertical axis is determined using amplitudes, at the stride frequency, of two horizontal components of the acceleration signal in the reference frame.

16. The method as claimed in claim 8, in which, said characteristic or said characteristics are selected from the set of characteristics of the motions of the chest of the pedestrian as claimed in claim 8 or from the set of characteristics of the motions of a free limb of the pedestrian as claimed in claim 9, using an indicator characterizing a nature of a mechanical link between the sensor housing and the pedestrian.

17. The method as claimed in claim 9, in which said data representative of the motion of the sensor housing in the reference frame are generated using at least one gyrometer with at least two measurement axes, and for which at least one characteristic from among said characteristic or said characteristics is that the rotation speed signal due to walking/running along the medio lateral axis exhibits a power spike at the stride rate.

18. The method as claimed in claim 1, in which, when motions impressed on said sensor assembly are due to a motion of the chest-thorax-pelvis assembly of the pedestrian, use is made of at least the characteristic according to which a motion signal in translation at the footstep frequency exhibits power along the antero-posterior axis, and, when the motions impressed on said sensor assembly are due to the motion of a free limb of the pedestrian, use is made of at least the characteristic according to which a motion signal in rotation at the stride frequency exhibits power in relation to the medio lateral axis.

* * * * *